(12) United States Patent
Li et al.

(10) Patent No.: US 10,979,263 B2
(45) Date of Patent: Apr. 13, 2021

(54) DATA PROCESSING METHOD AND DEVICE

(71) Applicant: ZTE Corporation, Shenzhen (CN)

(72) Inventors: Weimin Li, Shenzhen (CN); Zhifeng Yuan, Shenzhen (CN); Yuzhou Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/755,434

(22) PCT Filed: Oct. 12, 2018

(86) PCT No.: PCT/CN2018/110072
§ 371 (c)(1),
(2) Date: Apr. 10, 2020

(87) PCT Pub. No.: WO2019/072242
PCT Pub. Date: Apr. 18, 2019

(65) Prior Publication Data
US 2020/0244495 A1 Jul. 30, 2020

(30) Foreign Application Priority Data
Oct. 12, 2017 (CN) .......................... 201710947661.9

(51) Int. Cl.
H04L 27/20 (2006.01)
H04L 27/144 (2006.01)
H04L 27/36 (2006.01)

(52) U.S. Cl.
CPC ........ *H04L 27/2071* (2013.01); *H04L 27/144* (2013.01); *H04L 27/361* (2013.01)

(58) Field of Classification Search
CPC .. H04L 27/2071; H04L 27/144; H04L 27/361
See application file for complete search history.

(56) References Cited

FOREIGN PATENT DOCUMENTS

| CN | 104935357 A | 9/2015 |
|---|---|---|
| CN | 105245294 A | 1/2016 |
| JP | 2008005068 A | 1/2008 |

OTHER PUBLICATIONS

International Search Report for corresponding application PCT/CN2018/110072 filed Oct. 12, 2018; dated Jan. 4, 2019.
Fu Shu-tang, "Analyzed and simulate of DSSS MSK demodulation method", Electronic Design Engineering, Jul. 2012, vol. 20, No. 13.
Jingwei Yin, "Application of the Differential Spread Spectrum Technique in Mobile Underwater Acoustic Communication", Science China, vol. 42, No. 4, Dec. 31, 2012.
Shu Zhong, MSK (Delay Coherent Demodulation and Its Artificial Realization for DC System of MSK), Journal of Shenzhen Polytechnic, vol. 5, No. 2, Dec. 31, 2006.

*Primary Examiner* — Ronald B Abelson
(74) *Attorney, Agent, or Firm* — Cantor Colburn LLP

(57) ABSTRACT

Provided are a data processing method and device. The method may include: generating first data, wherein generating the first data comprises one of: performing differential encoding on second data to generate third data, and processing the third data by using a sequence to generate the first data; processing the second data by using a sequence to generate fourth data, and performing differential encoding on the fourth data to generate the first data; and processing the second data by using a sequence to generate the first data.

18 Claims, 6 Drawing Sheets

---

Generating first data, wherein generating the first data includes one of: performing differential encoding on second data to generate third data, and processing the third data by using a sequence to generate the first data; processing the second data by using a sequence to generate fourth data, and performing differential encoding on the fourth data to generate the first data; and processing the second data by using a sequence to generate the first data ⟶ S102

Generating first data, wherein generating the first data includes one of: performing differential encoding on second data to generate third data, and processing the third data by using a sequence to generate the first data; processing the second data by using a sequence to generate fourth data, and performing differential encoding on the fourth data to generate the first data; and processing the second data by using a sequence to generate the first data — S102

Fig. 1

Obtaining sixth data, wherein obtaining the sixth data includes one of: detecting seventh data by using a sequence to obtain eighth data, and performing differential detection on the eighth data to obtain the sixth data; performing differential detection on the seventh data to obtain ninth data, and detecting the ninth data by using a sequence to obtain the sixth data; and detecting the seventh data by using a sequence to obtain tenth data, and performing compensation processing on the tenth data to obtain the sixth data — S202

Fig. 2

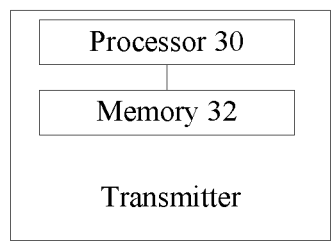

Fig. 3

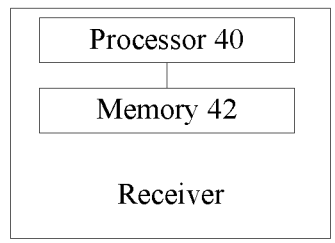

Fig. 4

DATA PROCESSING METHOD AND DEVICE

TECHNICAL FIELD

The present disclosure relates to the field of communications, in particular to a data processing method and device.

BACKGROUND

Application scenarios of 5th-Generation (5G) communication technologies and future communication technologies in the relevant art include an enhanced Mobile Broadband (eMBB), a massive Machine Type communication (mMTC), and an Ultra Reliability Low Latency Communication (URLLC). Among these application scenarios, the eMBB scenario is used to support a mobile broadband, with a main service requirement being large data packet transmission, high data rate and high spectral efficiency. The mMTC scenario is used to support communication of massive devices, with a main service requirement being massive devices and small data packet transmission. At present, a design goal determined by the International Telecommunications Union (ITU) and the 3rd Generation Partnership Project (3GPP) for a 5G mMTC scenario is to support a connection density of 1,000,000 devices per square kilometer. The URLLC scenario is used to support ultra reliability low latency communication, with a main service requirement being ultra reliability low latency transmission.

For the requirement of the mMTC scenario on the massive devices and the small data packet transmission and the requirement of the URLLC scenario on the ultra reliability low latency transmission, a traditional communication process design based on random access of a terminal, grant control of a base station and the like has been far from satisfactory since the traditional communication process design has limited capacity for system accessing devices, and requires a large signaling overhead and a long time to perform the access and data transmission processes.

In order to meet the requirements of the 5G communication technology and similar requirements of the future communication technology, grant-free transmission (or transmission without grant) may be taken into consideration. A terminal device can conduct data transmission whenever such transmission is needed, so that the long and complex random access process and grant control process are omitted, thereby greatly reducing the transmission latency and the signaling overhead. In order to improve a utilization efficiency of transmission resources, it may further be allowable for multiple users or data streams to share and use the same transmission resources (for example, the same time-frequency resource blocks) to perform non-orthogonal multiplexing, thus implementing a Non-Orthogonal Multiple Access (NOMA). For the purpose of guaranteeing non-orthogonal access and multiplexing transmission performances for the multiple users or data streams, it is often necessary to use an advanced receiver, such as an interference cancellation receiver.

One defect of the grant-free and non-orthogonal transmission solution in the relevant art lies in that the prevention of collision between transmission resources (for example, time-frequency resources, sequences, reference signals, etc.) of the multiple users or data streams relies on pre-configuration or semi-static configuration provided by the system, which results in that a grant-free transmission mechanism of the system is not flexible enough and can only support a limited number of users. Alternatively, the collision between the transmission resources of the multiple users or data streams may also be allowed, but in order to guarantee the system performance, a very complex receiver needs to be adopted, and a great number of preamble sequences, pilot sequences or reference signals or the like may be adopted to reduce the collision probability and improve the identification detection of the users or data streams or the accuracy of channel estimation; nevertheless, such a method will occupy vast resource overhead and affect a system transmission efficiency.

Concerning the above-mentioned problems in the relevant art, an effective solution has not yet been found.

SUMMARY

The embodiments of the present disclosure provide a data processing method and device, which may solve at least one of problems of insufficient flexibility, a small number of supported users, a large resource overhead, a poor system transmission efficiency, a high complexity of a receiver and the like in the relevant art.

According to an embodiment of the present disclosure, a data processing method is provided, including that: first data is generated, wherein the operation that the first data is generated includes one of: differential encoding is performed on second data to generate third data, and the third data is processed by using a sequence to generate the first data; the second data is processed by using a sequence to generate fourth data, and differential encoding is performed on the fourth data to generate the first data; and the second data is processed by using a sequence to generate the first data.

According to an embodiment of the present disclosure, another data processing method is provided, including that: sixth data is obtained, wherein the operation that the sixth data is obtained includes one of: seventh data is detected by using a sequence to obtain eighth data, and differential detection is performed on the eighth data to obtain the sixth data; differential detection is performed on the seventh data to obtain ninth data, and the ninth data is detected by using a sequence to obtain the sixth data; and the seventh data is detected by using a sequence to obtain tenth data, and compensation processing is performed on the tenth data to obtain the sixth data.

According to another embodiment of the present disclosure, a transmitter is provided, including: a processor and a memory storing an instruction executable to the processor; and when the instruction is executed by the processor, the following operation is executed: first data is generated, wherein the operation that the first data is generated includes one of: differential encoding is performed on second data to generate third data, and the third data is processed by using a sequence to generate the first data; the second data is processed by using a sequence to generate fourth data, and differential encoding is performed on the fourth data to generate the first data; and the second data is processed by using a sequence to generate the first data.

According to another embodiment of the present disclosure, a receiver is provided, including: a processor and a memory storing an instruction executable to the processor; and when the instruction is executed by the processor, the following operation is executed: a sixth data is obtained, wherein the operation that the sixth data is obtained includes one of: seventh data is detected by using a sequence to obtain eighth data, and differential detection is performed on the eighth data to obtain the sixth data; differential detection is performed on the seventh data to obtain ninth data, and the ninth data is detected by using a sequence to obtain the sixth data; and the seventh data is detected by using a sequence to obtain tenth data, and compensation processing is performed on the tenth data to obtain the sixth data.

According to still another embodiment of the present disclosure, a storage medium is further provided. The storage medium is configured to store a program code for executing the following operation.

First data is generated, wherein the operation that the first data is generated includes one of: differential encoding is performed on second data to generate third data, and the third data is processed by using a sequence to generate the first data; the second data is processed by using a sequence to generate fourth data, and differential encoding is performed on the fourth data to generate the first data; and the second data is processed by using a sequence to generate the first data.

By means of the embodiments of the present disclosure, since differential encoding is used and a sequence is used for spreading or modulation processing, a receiver can make a detection by using the sequence and a differential detection to implement identification detection on a user or a data stream. Moreover, the solution requires a small reference signal overhead and a low receiver complexity. Therefore, the solution in the embodiments of the present disclosure may solve at least one of problems of insufficient flexibility, a small number of supported users, a large resource overhead, a poor system transmission efficiency, a high receiver complexity and the like in the relevant art, may implement more flexible and efficient grant-free and non-orthogonal transmission, and has a good system transmission efficiency and a low receiver complexity.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings:

FIG. 1 is a flowchart of a data processing method according to an embodiment of the present disclosure.

FIG. 2 is a flowchart of another data processing method according to an embodiment of the present disclosure.

FIG. 3 is a structural block diagram of a transmitter according to an embodiment of the present disclosure.

FIG. 4 is a structural block diagram of a receiver according to an embodiment of the present disclosure.

DETAILED DESCRIPTION OF THE EMBODIMENTS

Figure 5:
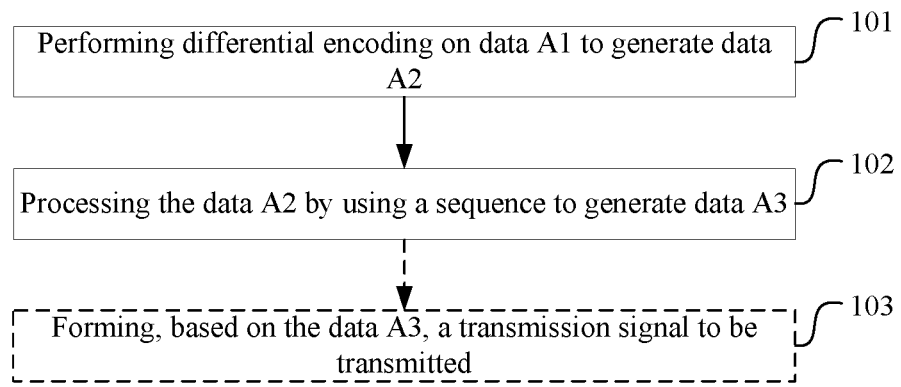
FIG. 5 is a first flowchart of a data processing method provided by an embodiment of the present disclosure.

The present disclosure is described below in detail with reference to the accompanying drawings and in combination with the embodiments. It is to be noted that the embodiments of the present disclosure and the characteristics of the embodiments may be combined with each other if there is no conflict.

It should be noted that, terminologies such as "first" and "second" in the specification, claims and accompanying drawings of the present disclosure are only used to distinguish similar objects, rather than to describe a special order or a precedence order.

First Embodiment

A network architecture in this embodiment of the present disclosure may include: a transmitter and a receiver; and interaction is conducted between the transmitter and the receiver.

This embodiment provides a data processing method. FIG. 1 is a flowchart of a data processing method according to an embodiment of the present disclosure. As shown in FIG. 1, the flowchart includes the following operation S102.

In S102, first data is generated, wherein the operation that the first data is generated may include one of: differential encoding is performed on second data to generate third data, and the third data is processed by using a sequence to generate the first data; the second data is processed by using a sequence to generate fourth data, and differential encoding is performed on the fourth data to generate the first data; and the second data is processed by using a sequence to generate the first data.

By means of the above operations, since differential encoding is used and a sequence is used for processing (such as spreading or modulation), a receiver can make a detection by using the sequence and a differential detection to implement identification detection on a user or a data stream. Moreover, the solution requires a small reference signal overhead and a low receiver complexity. Therefore, the solution in the embodiment of the present disclosure may solve at least one of problems of insufficient flexibility, a small number of supported users, a large resource overhead, a poor system transmission efficiency, a high receiver complexity and the like in the relevant art, may implement more flexible and efficient grant-free and non-orthogonal transmission, and has a good system transmission efficiency and a low receiver complexity.

In some implementation of the embodiment, an executer of the above operations may be a terminal, a base station, etc., and may specifically be a transmitter, a radio-frequency module or the like but is not limited thereto.

In some implementation of the embodiment, the second data may include at least one of: a reference signal; and data information.

The reference signal may include one of: a reference signal determined according to user identity information; a reference signal determined from a reference signal set; and a preset reference signal.

The data information may include one of: a data bit; and a data symbol generated by performing encoding and modulation on a data bit. In some exemplary implementation, the data information may be one of: a data bit obtained after a data bit to be transmitted by a transmitting end is encoded; and a data symbol obtained after a data bit to be transmitted by a transmitting end is encoded and modulated.

The data bit may include at least one of: payload information; user identity information; sequence information; sequence set information; and reference signal information. The above-mentioned information may be entirely carried in the data bit to be transmitted by the transmitting end and then the data bit may be encoded to obtain an encoded data bit. Alternatively, a part of the above-mentioned information may be carried in the obtained data bit after encoding, for example, the user identity information may be carried in a cyclic redundancy check bit.

In some implementation of the embodiment, the sequence may include at least one of: a sequence randomly selected from a first sequence set; a sequence obtained from a second sequence set according to a first preset rule; a sequence obtained from a third sequence set according to system configuration information; a sequence generated randomly; and a sequence generated according to a second preset rule. The sequence has a length of L, the L being an integer greater than 1.

In some implementation of the embodiment, the operation that the differential encoding is performed on the second data to generate the third data may include one of: the differential encoding is performed on the second data in a specified manner to generate the third data; the differential encoding is performed on the second data in a specified manner and according to a reference signal to generate the third data; the differential encoding is performed on the second data in a specified manner and according to a reference signal in the second data to generate the third data; and the differential encoding is performed on a data symbol in the second data in a specified manner and according to a reference signal in the second data to generate the third data. The specified manner may include at least one of: frequency domain differential encoding, time domain differential encoding, time-frequency domain differential encoding, and segmental differential encoding.

In this embodiment, the operation that the third data is processed by using the sequence to generate the first data may include that: spreading processing or modulation processing is performed on the third data by using the sequence to generate the first data.

In this embodiment, the operation that the second data is processed by using the sequence to generate fourth data may include that: spreading processing or modulation processing is performed on the second data by using the sequence to generate the fourth data.

In some implementation of the embodiment, the operation that the differential encoding is performed on the fourth data to generate the first data may include one of: the differential encoding is performed on the fourth data in a specified manner to generate the first data; the differential encoding is performed on the fourth data in a specified manner and according to a reference signal to generate the first data; the differential encoding is performed on the fourth data in a specified manner and according to a symbol, included in the fourth data and obtained by processing a reference signal by using a sequence, to generate the first data; and the differential encoding is performed, in a specified manner and according to a symbol included in the fourth data and obtained by processing a reference signal by using a sequence, on a symbol included in the fourth data and obtained by processing a data symbol by using a sequence to generate the first data. The specified manner may include at least one of: frequency domain differential encoding, time domain differential encoding, time-frequency domain differential encoding, and segmental differential encoding.

In this embodiment, the operation that the second data is processed by using the sequence to generate the first data may include that: spreading processing or modulation processing is performed on the second data by using the sequence to generate the first data.

In some implementation of the embodiment, after the first data is generated, the method may further include that: a transmission signal to be transmitted is formed on a specified time-frequency resource based on the first data. The specified time-frequency resource is obtained via at least one of the following manners: the specified time-frequency resource may be selected randomly; the specified time-frequency resource may be determined according to a third preset rule; and the specified time-frequency resource may be determined according to system configuration information.

This embodiment provides another data processing method. FIG. 2 is a flowchart of another data processing method according to an embodiment of the present disclosure. As shown in FIG. 2, the flowchart includes the following operation.

At S202: sixth data is obtained, wherein the operation that the sixth data is obtained may include one of: seventh data is detected by using a sequence to obtain eighth data, and differential detection is performed on the eighth data to obtain the sixth data; differential detection is performed on the seventh data to obtain ninth data, and the ninth data is detected by using a sequence to obtain the sixth data; and the seventh data is detected by using a sequence to obtain tenth data, and compensation processing is performed on the tenth data to obtain the sixth data.

In some implementation of the embodiment, an executer of the above operations may be a terminal, a base station, etc., and may specifically be a receiver, a receiving module or the like but is not limited thereto.

In some implementation of the embodiment, the seventh data may include at least one of: data received by each receiving antenna of the receiver; and data obtained by processing the data received by multiple receiving antennas of the receiver.

In some implementation of the embodiment, the sequence used in the S202 may include at least one of: a sequence in a fourth sequence set; a sequence generated according to a fourth preset rule; a sequence identified, according to a fifth sequence set and the seventh data, from the fifth sequence set; and a sequence identified, according to a sixth sequence set and the ninth data, from the sixth sequence set. The sequence has a length of L, the L being an integer greater than 1.

The sequence in the fourth sequence set may include: respective sequences in the fourth sequence set, a part of sequences in the fourth sequence set, or one or more sequences identified from the fourth sequence set.

In some implementation of the embodiment, the operation that the seventh data is detected by using the sequence to obtain the eighth data may include one of: data obtained by processing the seventh data is detected by using the sequence to obtain the eighth data; a correlation matrix is obtained according to the seventh data, and the seventh data is detected by using the sequence and the correlation matrix to obtain the eighth data; and a correlation matrix is obtained according to data obtained by processing the seventh data, and the data obtained by processing the seventh data is detected by using the sequence and the correlation matrix to obtain the eighth data. The operation that the seventh data is processed may include that: the seventh data is processed by using at least one of: matrix conversion, combining according to a preset rule, frequency offset compensation, time offset compensation, etc.

In some implementation of the embodiment, the operation that the differential detection is performed on the eighth data to obtain the sixth data may include that: the differential detection is performed on the eighth data in a specified manner to obtain the sixth data. The specified manner may include at least one of: frequency domain differential detection; time domain differential detection; time-frequency domain differential detection; and segmental differential detection.

In some implementation of the embodiment, the operation that the differential detection is performed on the seventh data to obtain the ninth data may include that: the differential detection is performed on the seventh data in a specified manner to obtain the ninth data. The specified manner may include at least one of: frequency domain differential detection; time domain differential detection; time-frequency domain differential detection; and segmental differential detection.

In some implementation of the embodiment, the operation that the ninth data is detected by using the sequence to obtain the sixth data may include one of: data obtained by processing the ninth data is detected by using the sequence to obtain the sixth data; a correlation matrix is obtained according to the ninth data, and the ninth data is detected by using the sequence and the correlation matrix to obtain the sixth data; and a correlation matrix is obtained according to data obtained by processing the ninth data, and the data obtained by processing the ninth data is detected by using the sequence and the correlation matrix to obtain the sixth data. The operation that the ninth data is processed may include that: the ninth data is processed by using at least one of: matrix conversion, combining according to a preset rule, frequency offset compensation, time offset compensation, etc.

In some implementation of the embodiment, the operation that the seventh data is detected by using the sequence to obtain the tenth data may include one of: data obtained by processing the seventh data is detected by using the sequence to obtain the tenth data; a correlation matrix is obtained according to the seventh data, and the seventh data is detected by using the sequence and the correlation matrix to obtain the tenth data; and a correlation matrix is obtained according to data obtained by processing the seventh data, and the data obtained by processing the seventh data is detected by using the sequence and the correlation matrix to obtain the tenth data. The operation that the seventh data is processed may include that: the seventh data is processed by using at least one of: matrix conversion, combining according to a preset rule, frequency offset compensation, time offset compensation, etc.

In some implementation of the embodiment, for the operation that compensation processing is performed on the tenth data to obtain the sixth data, the compensation processing may include at least one of: channel compensation; frequency offset compensation; and time offset compensation. The compensation processing may also be referred to as equalization processing. The channel compensation may include at least one of: channel attenuation amplitude compensation; and channel rotation phase compensation.

In this embodiment, the correlation matrix may include an autocorrelation matrix and/or cross-correlation matrix. The operation that the correlation matrix is obtained may also be replaced as an operation that a covariance matrix is obtained. The covariance matrix may include an auto-covariance matrix and/or a cross-covariance matrix. The sequence and the covariance matrix may further be used for detection. The operation that the correlation matrix is obtained may also be replaced as an operation that a second-order moment is obtained. The sequence and the second-order moment may further be used for detection.

In some implementation of the embodiment, after the sixth data is obtained, the method may further include that: eleventh data is obtained according to the sixth data, which may include at least one of: the sixth data is demodulated and decoded to obtain the eleventh data; data obtained by processing the sixth data is demodulated and decoded to obtain the eleventh data; the sixth data meeting a first predetermined condition is demodulated and decoded to obtain the eleventh data; data obtained by processing the sixth data meeting a second predetermined condition is demodulated and decoded to obtain the eleventh data; and data obtained by processing the sixth data and meeting a third predetermined condition is demodulated and decoded to obtain the eleventh data.

In some implementation of the embodiment, after the eleventh data is obtained according to the sixth data, the method may further include at least one of: information is obtained from the eleventh data; and reconstruction is performed based on the eleventh data to obtain twelfth data.

The information obtained from the eleventh data may include at least one of: payload information; user identity information; sequence information; sequence set information; and reference signal information.

When reconstruction is performed based on the eleventh data to obtain the twelfth data, the reconstruction may be performed according to information obtained from the eleventh data.

In some implementation of the embodiment, after reconstruction is performed based on the eleventh data to obtain the twelfth data, the method may further include at least one of: channel estimation is performed by using the twelfth data to obtain a channel estimation result; and interference of the twelfth data is eliminated from data received from the receiver.

In this embodiment, the operation that the data is detected by using the sequence may be implemented by using a blind detection manner. For example, data received by multiple receiving antennas of the receiver is combined blindly according to a preset rule; respective candidate sequences are traversed to perform blind detection on the data; or, a sequence that may be used is identified from respective candidate sequences, and the identified sequence is used to perform the blind detection on the data.

By means of the above-mentioned descriptions on the implementation manner, the person skilled in the art may clearly understand that the present disclosure may be implemented by software plus a necessary universal hardware platform, and may alternatively be implemented by hardware, but under most conditions, the former is a better implementation manner. Based on such an understanding, the technical solutions of the embodiments of the present disclosure essentially, or the part contributing to the relevant art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device) to execute the methods described in the embodiments of the present disclosure.

Second Embodiment

This embodiment further provides a transmitter, a receiver, and the like for implementing the above-mentioned embodiments and exemplary implementation manners. The content that has already been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

FIG. 3 is a structural block diagram of a transmitter according to an embodiment of the present disclosure. As shown in FIG. 3, the device may include: a processor 30 and a memory 32 storing an instruction executable to the processor; and when the instruction is executed by the processor, the following operation is executed:

First data is generated, wherein the operation that the first data is generated may include one of: differential encoding is performed on second data to generate third data, and the third data is processed by using a sequence to generate the first data; the second data is processed by using a sequence to generate fourth data, and the differential encoding is performed on the fourth data to generate the first data; and the second data is processed by using a sequence to generate the first data.

FIG. 4 is a structural block diagram of a receiver according to an embodiment of the present disclosure. As shown in FIG. 4, the device may include: a processor 40 and a memory 42 storing an instruction executable to the processor; and when the instruction is executed by the processor, the following operation is executed:

Sixth data is obtained, wherein the operation that the sixth data is obtained may include one of: seventh data is detected by using a sequence to obtain eighth data, and differential detection is performed on the eighth data to obtain the sixth data; the differential detection is performed on the seventh data to obtain ninth data, and the ninth data is detected by using a sequence to obtain the sixth data; and the seventh data is detected by using a sequence to obtain tenth data, and compensation processing is performed on the tenth data to obtain the sixth data.

It is to be noted that each module may be implemented by software or hardware. The later may be implemented via the following manner but is not limited thereto: the above modules are located in the same processor; or the above modules are respectively located in different processors in any combined form.

Third Embodiment

This embodiment is an exemplary embodiment of the present disclosure, and is used to describe the present disclosure in detail in combination with exemplary implementation manners.

In the relevant art, a grant-free and non-orthogonal transmission solution for multiple users or data streams is based on a main concept that a system pre-configures or semi-statically configures a transmission resource for the multiple users or data streams, including but not limited to a time frequency resource, a spreading sequence, a reference signal, etc. The reference signals used by the multiple users or data streams are different (that is, no collision occurs); and a receiver performs user identification and channel estimation via the reference signal, and detects and separates data transmitted by the multiple users or data streams. Herein, the spreading sequence may be necessary and may also be unnecessary. When the spreading sequence is used, the multiple users or data streams may use different spreading sequences according to pre-configuration or semi-static configuration of the system (that is, no collision occurs). One defect of the grant-free and non-orthogonal transmission solution lies in that the prevention of collision relies on pre-configuration or semi-static configuration provided by the system, which results in that a grant-free transmission mechanism of the system is not flexible enough and can only support a limited number of users. A more flexible grant-free and non-orthogonal transmission solution is based on a main concept that a user selects a transmission resource randomly, including but not limited to a time frequency resource, a preamble sequence, a spreading sequence, a reference signal, etc. In this solution, the transmission resources used by different users or data streams may be collided. Such a grant-free transmission mechanism is very flexible, but due to an influence of the collision, the receiver has a very high complexity in order to guarantee the transmission performance of the user and support the larger number of users. In order to control the influence of the collision, one method is to use a great number of preamble sequences, pilot sequences or reference signals or the like to reduce the collision probability, and improve the identification detection of the users or data streams or the accuracy of channel estimation. Nevertheless, such a method will occupy a lot of resource overheads and affect a system transmission efficiency.

In order to better support the above-mentioned more flexible grant-free, and better support the non-orthogonal transmission solution in the relevant art, it is necessary to further design a good transmission solution of a transmitter and a good receiving detection solution of a receiver, so that the receiver can effectively implement receiving detection on multiple users or data streams, the system is guaranteed to have a good transmission efficiency, and the receiver complexity is controlled effectively.

This embodiment provides a data processing method, including design solutions on the transmitter and the receiver.

Technical solution on the transmitter is described first.

A data processing method may include that: first data is generated, wherein the operation that the first data is generated may include one of: differential encoding is performed on second data to generate third data, and the third data is processed by using a sequence to generate the first data; the second data is processed by using a sequence to generate fourth data, and the differential encoding is performed on the fourth data to generate the first data; and the second data is processed by using a sequence to generate the first data.

In some implementation of the embodiment, the second data may include at least one of: a reference signal; and data information. The reference signal may include at least one of: a reference signal determined according to user identity information; a reference signal determined from a reference signal set; and a preset reference signal. The data information may include one of: a data bit; and a data symbol generated by performing encoding and modulation on a data bit. The data bit may include at least one of: payload information; user identity information; sequence information; sequence set information; and reference signal information.

In some implementation of the embodiment, the sequence has a length of L. The sequence may include at least one of: a sequence selected randomly from a sequence set; a sequence obtained from a sequence set according to a preset rule; a sequence obtained from a sequence set according to system configuration information; a sequence generated randomly; and a sequence generated according to a preset rule. The L is an integer greater than 1.

In some implementation of the embodiment, the operation that the differential encoding is performed on the data may include one of: the differential encoding is performed on the data in a specified manner; the differential encoding is performed on the data in a specified manner and according to a reference signal; the differential encoding is performed on the data in a specified manner and according to a reference signal in the data; and the differential encoding is performed on a data symbol in the data in a specified manner and according to a reference signal in the data. The specified manner may include at least one of: frequency domain differential encoding, time domain differential encoding, time-frequency domain differential encoding, and segmental differential encoding.

In some implementation of the embodiment, the operation that the data is processed by using the sequence may include one of: the data is spread by using the sequence; and the data is modulated by using the sequence.

Technical solution on the receiver is described below.

A data processing method may include that: sixth data is obtained, wherein the operation that the sixth data is obtained may include one of: seventh data is detected by using a sequence to obtain eighth data, and differential detection is performed on the eighth data to obtain the sixth data; differential detection is performed on the seventh data to obtain ninth data, and the ninth data is detected by using a sequence to obtain the sixth data; and the seventh data is detected by using a sequence to obtain tenth data, and specified processing is performed on the tenth data to obtain the sixth data.

In some implementation of the embodiment, the seventh data may include at least one of: data received by each receiving antenna of the receiver; and data obtained by performing the specified processing on the data received by multiple receiving antennas of the receiver.

In some implementation of the embodiment, the sequence has a length of L. The sequence may include at least one of: a sequence in a sequence set; a sequence generated according to a preset rule; a sequence identified, according to a sequence set and the seventh data, from the sequence set; and a sequence identified, according to a sequence set and the ninth data, from the sequence set. The L is an integer greater than 1.

In some implementation of the embodiment, the operation that the data is detected by using the sequence may include at least one of: data obtained by performing specified processing on the data is detected by using the sequence; a correlation matrix is obtained according to the data, and the data is detected by using the sequence and the correlation matrix; and a correlation matrix is obtained according to data obtained by performing specified processing on the data, and the data obtained by performing the specified processing on the data is detected by using the sequence and the correlation matrix.

In some implementation of the embodiment, the operation that the differential detection is performed on the data may include that: the differential detection is performed on the data in a specified manner. The specified manner may include at least one of: frequency domain differential detection; time domain differential detection; time-frequency domain differential detection; and segmental differential detection.

In some implementation of the embodiment, the method in this embodiment may further include at least one of: the sixth data is demodulated and decoded to obtain eleventh data; data obtained by performing specified processing on the sixth data is demodulated and decoded to obtain eleventh data; the sixth data meeting a specified condition is demodulated and decoded to obtain eleventh data; data obtained by performing specified processing on the sixth data meeting a specified condition is demodulated and decoded to obtain eleventh data; and data obtained by performing specified processing on the sixth data and meeting a specified condition is demodulated and decoded to obtain eleventh data.

In some implementation of the embodiment, the method in this embodiment may further include that: information is obtained from the eleventh data. The information may include at least one of: payload information; user identity information; sequence information; sequence set information; and reference signal information.

In some implementation of the embodiment, the method in this embodiment may further include that: reconstruction is performed based on the eleventh data to obtain twelfth data.

In some implementation of the embodiment, the method in this embodiment may further include that: channel estimation is performed by using the twelfth data to obtain a channel estimation result.

In some implementation of the embodiment, the method in this embodiment may further include that: interference of the twelfth data is eliminated from data received by the receiver.

This embodiment may further include multiple implementation manners below.

First Implementation Manner

This implementation manner provides a data processing method, which may be applied to a transmitter, including but not limited to a terminal transmitter, a base station transmitter, etc. FIG. 5 is a first flowchart of a data processing method according to an embodiment of the present disclosure. As shown in FIG. 5, the method may include operations 101 and 102.

In operation 101, differential encoding is performed on data A1 to generate data A2.

The data A1 may include at least one of: a reference signal; and a data symbol.

The reference signal may also be referred to as a reference symbol, a pilot signal, a pilot symbol, a pilot sequence, a training symbol, a training sequence, etc.

The reference signal may include at least one of: a reference signal determined according to user identity information; a reference signal determined from a reference signal set; and a preset reference signal.

The data symbol may include: a data symbol generated by performing encoding and modulation on a data bit.

The data bit may include at least one of: payload information; user identity information; sequence information; sequence set information; and reference signal information.

The operation that differential encoding is performed on data A1 to generate data A2 may include one of the following operations.

The differential encoding is performed on the data A1 in a specified manner to generate the data A2.

The differential encoding is performed on the data A1 in a specified manner and according to a reference signal to generate the data A2.

The differential encoding is performed on the data A1 in a specified manner and according to a reference signal in the data A1 to generate the data A2.

The differential encoding is performed on a data symbol in the data A1 in a specified manner and according to a reference signal in the data A1 to generate the data A2.

The specified manner may include at least one of: frequency domain differential encoding; time domain differential encoding; time-frequency domain differential encoding; and segmental differential encoding.

The time-frequency domain differential encoding may be the frequency domain differential encoding first and then the time domain differential encoding, or the time domain differential encoding first and then the frequency domain differential encoding.

The segmental differential encoding may be used in cooperation with the frequency domain differential encoding, the time domain differential encoding, or the time-frequency domain differential encoding, to implement frequency domain segmental differential encoding, time domain segmental differential encoding, or time-frequency domain segmental differential encoding.

It is to be noted that the differential encoding described in this implementation manner may also be referred to as differential modulation.

In operation 102, the data A2 is processed by using a sequence to generate data A3.

The sequence may include at least one of: a sequence randomly selected from a sequence set; a sequence obtained from a sequence set according to a preset rule; a sequence obtained from a sequence set according to system configuration information; a sequence generated randomly; and a sequence generated according to a preset rule. The sequence has a length of L, the L being an integer greater than 1.

The sequence set may include at least one of: a preset sequence set; and a sequence set generated according to a preset rule.

The operation that the data A2 is processed by using a sequence to generate data A3 may include one of: spreading processing is performed on the data A2 by using the sequence to generate the data A3; and modulation processing is performed on the data A2 by using the sequence to generate the data A3.

It is to be noted that the sequence described in this implementation manner may also be referred to as a code.

In some implementation of the embodiment, the method may further include operation 103.

In the operation 103, a transmission signal to be transmitted is formed based on the data A3.

The operation that a transmission signal is formed based on the data A3 may include that: the transmission signal is formed on a specified time frequency resource based on the data A3. The specified time frequency resource may be selected randomly, or determined according to a preset rule, or configured by a system. The system configuration may use pre-configuration, semi-static configuration or dynamic configuration, etc.

In the method, a transmitter performs differential encoding on data first and then performs spreading or modulation processing by using a sequence, which is helpful for a receiver to make a detection by using the sequence and a differential detection to implement identification detection on a user or a data stream. Only a small number of reference signals are required, and an influence of a channel may be eliminated by means of the differential detection; and therefore, a good system transmission efficiency and a low receiver complexity are achieved.

The method may be applied to K transmitters, the K being an integer greater than or equal to 1. The K transmitters respectively perform the differential encoding on data, then perform the spreading or modulation processing by using a sequence, and form, on a specified time frequency resource based on the processed data, a transmission signal to be transmitted. The sequence used by the K transmitters may be selected randomly or generated randomly, and may be orthogonal or non-orthogonal. The specified time frequency resource used by the K transmitters may be selected randomly, or may be the same time frequency resource. Therefore, the method may be used to implement multi-user grant-free and non-orthogonal transmission.

Second Implementation Manner

Figure 6:
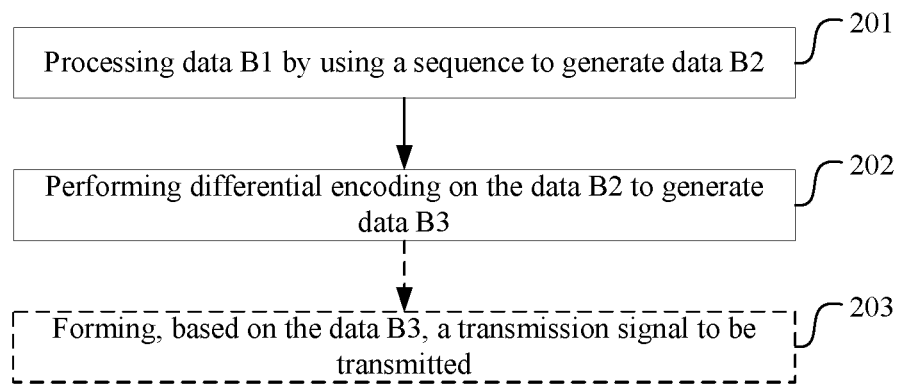
FIG. 6 is a second flowchart of a data processing method provided by an embodiment of the present disclosure.

This implementation manner provides a data processing method, which may be applied to a transmitter, including but not limited to a terminal transmitter, a base station transmitter, etc. FIG. 6 is a second flowchart of a data processing method according to an embodiment of the present disclosure. As shown in FIG. 6, the method may include operations 201 and 202.

In operation 201, data B1 is processed by using a sequence to generate data B2.

The data B1 may include at least one of: a reference signal; and data information.

The reference signal may include at least one of: a reference signal determined according to user identity information; a reference signal determined from a reference signal set; and a preset reference signal.

In some exemplary implementation, the data information may include one of: a data bit; and a data symbol generated by performing encoding and modulation on the data bit. In some exemplary implementation, the data information may be one of: a data bit obtained after a data bit to be transmitted by a transmitting end is encoded; and a data symbol obtained after a data bit to be transmitted by a transmitting end is encoded and modulated.

The data bit may include at least one of: payload information; user identify information; sequence information; sequence set information; and reference signal information. The above-mentioned information may be entirely carried in the data bit to be transmitted by the transmitting end and then the data bit may be encoded to obtain an encoded data bit. Alternatively, a part of the above-mentioned information may be carried in the obtained data bit after encoding, for example, the user identity information may be carried in a cyclic redundancy check bit.

The sequence may include at least one of: a sequence randomly selected from a sequence set; a sequence obtained from a sequence set according to a preset rule; a sequence obtained from a sequence set according to system configuration information; a sequence generated randomly; and a sequence generated according to a preset rule. The sequence has a length of L, the L being an integer greater than 1.

The sequence set may include at least one of: a preset sequence set; and a sequence set generated according to a preset rule.

The operation that the data B1 is processed by using a sequence to generate data B2 may include one of: spreading processing is performed on the data B1 by using the sequence to generate the data B2; and modulation processing is performed on the data B1 by using the sequence to generate the data B2.

In operation 202, differential encoding is performed on the data B2 to generate data B3.

The operation that differential encoding is performed on the data B2 to generate data B3 may include the following operations.

The differential encoding is performed on the data B2 in a specified manner to generate the data B3.

The differential encoding is performed on the data B2 in a specified manner and according to a reference signal to generate the data B3.

The differential encoding is performed on the data B2 in a specified manner and according to a reference signal in the data B2 to generate the data B3.

The differential encoding is performed on a data symbol in the data B2 in a specified manner and according to a reference signal in the data B2 to generate the data B3.

The reference signal in the data B2 may be a reference signal obtained after a reference signal in the data B1 is processed by using the sequence in operation 201.

The data symbol in the data B2 may be a data symbol obtained after data information of the data B1 is processed by using the sequence in operation 201.

The specified manner may include at least one of: frequency domain differential encoding; time domain differential encoding; time-frequency domain differential encoding; and segmental differential encoding.

The time-frequency domain differential encoding may be the frequency domain differential encoding first and then the time domain differential encoding, or the time domain differential encoding first and then the frequency domain differential encoding.

The segmental differential encoding may be used in cooperation with the frequency domain differential encoding, the time domain differential encoding, or the time-frequency domain differential encoding, to implement frequency domain segmental differential encoding, time domain segmental differential encoding, or time-frequency domain segmental differential encoding.

In some implementation of the embodiment, the method may further include operation 203.

In operation 203, a transmission signal to be transmitted is formed based on the data B3.

The operation that a transmission signal is formed based on the data B3 may include that: the transmission signal is formed on a specified time frequency resource based on the data B3. The specified time frequency resource may be selected randomly, or determined according to a preset rule, or configured by a system. The system configuration may use pre-configuration, semi-static configuration or dynamic configuration, etc.

In the method, a transmitter performs spreading or modulation processing by using a sequence first and then performs differential encoding, which is helpful for a receiver to make a differential detection and a detection by using the sequence to implement identification detection on a user or a data stream. Only a small number of reference signals are required, and the receiver may eliminate an influence of a channel first via the differential detection, thus improving a receiving detection performance; and therefore, a good system transmission efficiency and a low receiver complexity are achieved.

The method may be applied to K transmitters, the K being an integer greater than or equal to 1. The K transmitters respectively perform the spreading or modulation processing on data by using a sequence, then perform the differential encoding, and form, on a specified time frequency resource based on the processed data, a transmission signal to be transmitted. The sequence used by the K transmitters may be selected randomly or generated randomly, and may be orthogonal or non-orthogonal. The specified time frequency resource used by the K transmitters may be selected randomly, or may be the same time frequency resource. Therefore, the method may be used to implement multi-user grant-free and non-orthogonal transmission.

Third Implementation Manner

Figure 7:
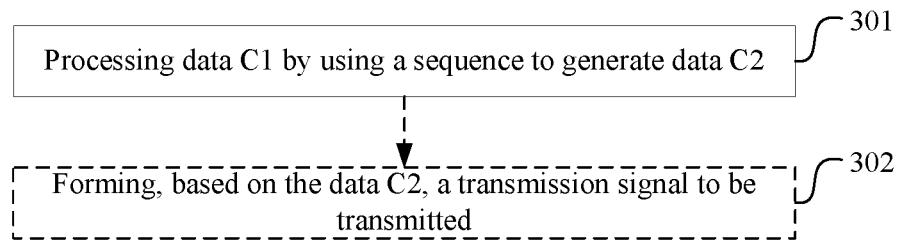
FIG. 7 is a third flowchart of a data processing method provided by an embodiment of the present disclosure.

This implementation manner provides a data processing method, which may be applied to a transmitter, including but not limited to a terminal transmitter, a base station transmitter, etc. FIG. 7 is a third flowchart of a data processing method according to an embodiment of the present disclosure. As shown in FIG. 7, the method may include the following operation 301.

In operation 301, data C1 is processed by using a sequence to generate data C2.

The data C1 may include at least one of: a reference signal; and data information.

The reference signal may include at least one of: a reference signal determined according to user identity information; a reference signal determined from a reference signal set; and a preset reference signal.

In some exemplary implementation, the data information may include one of: a data bit; and a data symbol generated by performing encoding and modulation on the data bit. In some exemplary implementation, the data information may be one of: a data bit obtained after a data bit to be transmitted by a transmitting end is encoded; and a data symbol obtained after a data bit to be transmitted by a transmitting end is encoded and modulated.

The data bit may include at least one of: payload information; user identify information; sequence information; sequence set information; and reference signal information. The above-mentioned information may be entirely carried in the data bit to be transmitted by the transmitting end and then the data bit may be encoded to obtain an encoded data bit.

Alternatively, a part of the above-mentioned information may be carried in the obtained data bit after encoding, for example, the user identity information may be carried in a cyclic redundancy check bit.

The sequence may include at least one of: a sequence randomly selected from a sequence set; a sequence obtained from a sequence set according to a preset rule; a sequence obtained from a sequence set according to system configuration information; a sequence generated randomly; and a sequence generated according to a preset rule. The sequence has a length of L, the L being an integer greater than 1.

The sequence set may include at least one of: a preset sequence set; and a sequence set generated according to a preset rule.

The operation that the data C1 is processed by using a sequence to generate data C2 may include one of: spreading processing is performed on the data C1 by using the sequence to generate the data C2; and modulation processing is performed on the data C1 by using the sequence to generate the data C2.

In some implementation of the embodiment, the method may further include operation 302.

In operation 302, a transmission signal to be transmitted is formed based on the data C2.

The operation that a transmission signal is formed based on the data C2 may include that: the transmission signal is formed on a specified time frequency resource based on the data C2. The specified time frequency resource may be selected randomly, or determined according to a preset rule, or configured by a system. The system configuration may use pre-configuration, semi-static configuration or dynamic configuration, etc.

The method may be applied to K transmitters, the K being an integer greater than or equal to 1. The K transmitters respectively perform the spreading or modulation processing on data by using a sequence, and form, on a specified time frequency resource based on the processed data, a transmission signal to be transmitted. The sequence used by the K transmitters may be selected randomly or generated randomly, and may be orthogonal or non-orthogonal. The specified time frequency resource used by the K transmitters may be selected randomly, or may be the same time frequency resource. Therefore, the method may be used to implement multi-user grant-free and non-orthogonal transmission.

In the method, as the transmitter may process a reference signal and data information together by using a sequence, when the method is used to implement the multi-user grant-free and non-orthogonal transmission, each user uses its sequence to process a reference signal; and thus, a collision probability among the reference signals of multiple users may be reduced, and a performance of the multi-user grant-free and non-orthogonal transmission may be improved.

Fourth Implementation Manner

Figure 8:
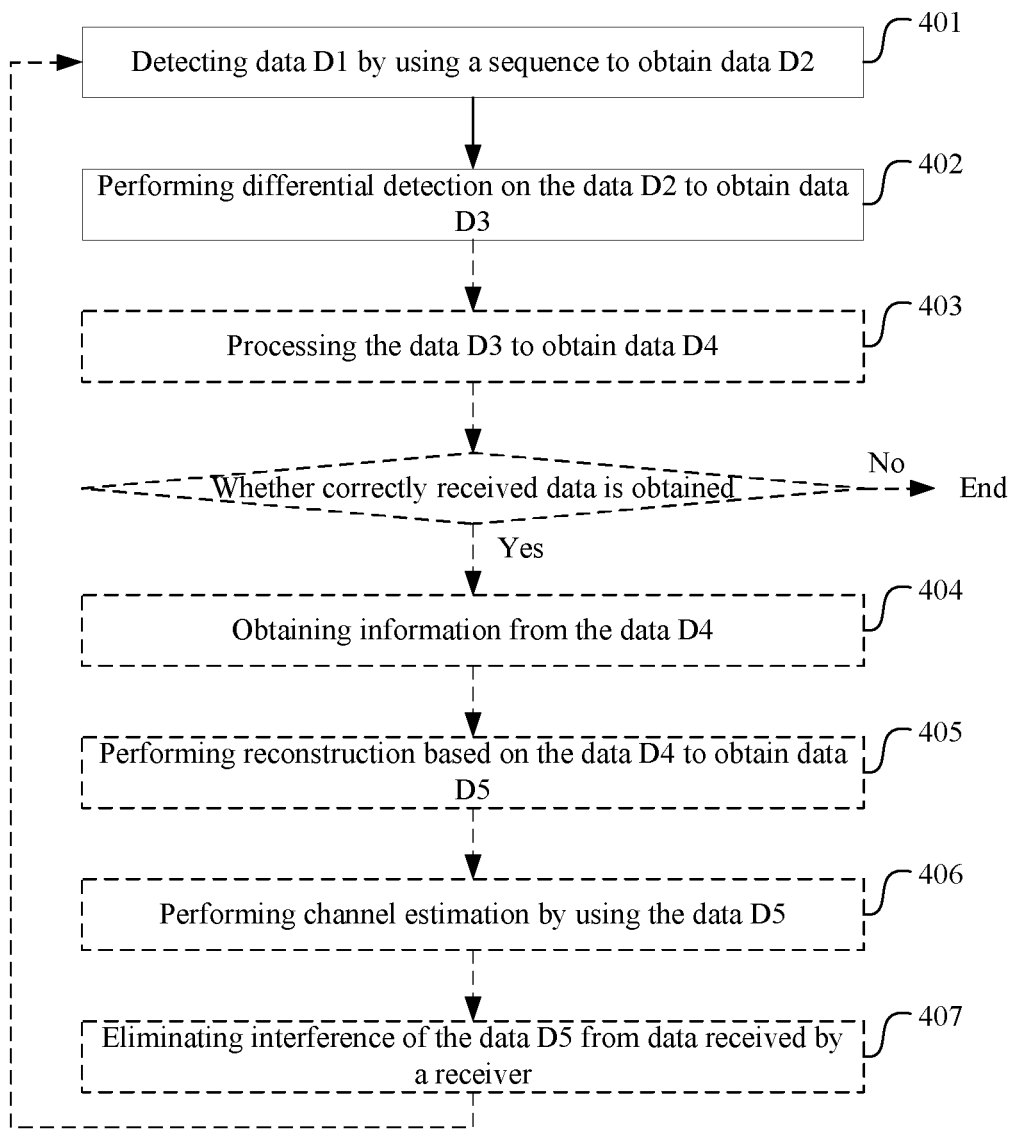
FIG. 8 is a fourth flowchart of a data processing method provided by an embodiment of the present disclosure.

This implementation manner provides a data processing method, which may be applied to a receiver, including but not limited to a base station receiver, a terminal receiver, etc. FIG. 8 is a fourth flowchart of a data processing method according to an embodiment of the present disclosure. As shown in FIG. 8, the method may include operations 401 and 402.

In operation 401, data D1 is detected by using a sequence to obtain data D2.

The data D1 may include at least one of: data received by each receiving antenna of the receiver; and data obtained by performing specified processing on data received by multiple receiving antennas of the receiver.

The specified processing may include: combining according to a preset rule. The preset rule may include a preset combining method and a preset combining vector.

The sequence may include at least one of: a sequence in a sequence set; a sequence generated according to a preset rule; and a sequence identified, according to a sequence set and the data D1, from the sequence set. The sequence has a length of L, the L being an integer greater than 1.

The sequence set may include at least one of: a preset sequence set; and a sequence set generated according to a preset rule.

The operation that data D1 is detected by using a sequence to obtain data D2 may include one of the following operations.

The data D1 is detected by using the sequence to obtain the data D2, for example, the data D1 is converted into a matrix M including L rows and N columns of data, and the matrix M is detected by using the sequence to obtain the data D2.

Data obtained by processing the data D1 is detected by using the sequence to obtain the data D2, for example, data corresponding to multiple receiving antennas in the data D1 is combined according to a preset rule, the obtained data is converted into a matrix M including L rows and N columns of data, and the matrix M is detected by using the sequence to obtain the data D2; or, frequency offset compensation and/or time offset compensation is performed on the data D1, the obtained data is converted into a matrix M including L rows and N columns of data, and the matrix M is detected by using the sequence to obtain the data D2.

A correlation matrix is obtained according to the data D1, and the data D1 is detected by using the sequence and the correlation matrix to obtain the data D2, for example, the data D1 is converted into a matrix M including L rows and N columns of data, an autocorrelation matrix X of the matrix M is calculated, and the matrix M is detected by using the sequence and the autocorrelation matrix X to obtain the data D2.

A correlation matrix is obtained according to data obtained by processing the data D1, and the data obtained by processing the data D1 is detected by using the sequence and the correlation matrix to obtain the data D2, for example, data corresponding to multiple receiving antennas in the data D1 is combined according to a preset rule, the obtained data is converted into a matrix M including L rows and N columns of data, an autocorrelation matrix of the matrix M is calculated, and the matrix M is detected by using the sequence and the autocorrelation matrix X to obtain the data D2; or, frequency offset compensation and/or time offset compensation is performed on the data D1, the obtained data is converted into a matrix M including L rows and N columns of data, an autocorrelation matrix of the matrix M is calculated, and the matrix M is detected by using the sequence and the autocorrelation matrix X to obtain the data D2.

The L is a length of the sequence, and the N is an integer greater than or equal to 1.

In operation 402, differential detection is performed on the data D2 to obtain data D3.

The operation that differential detection is performed on the data D2 to obtain data D3 may include that: the differential detection is performed on the data D2 in a specified manner to obtain the data D3. The specified manner may include at least one of: frequency domain differential detection; time domain differential detection; time-frequency domain differential detection; and segmental differential detection.

In some implementation of the embodiment, the method may further include operation 403.

In operation 403, the data D3 is processed to obtain data D4.

The operation that the data D3 is processed to obtain data D4 may include one of the following operations.

The data D3 is demodulated and decoded to obtain the data D4.

Data obtained after specified processing is performed on the data D3 is demodulated and decoded to obtain the data D4.

The data D3 meeting a specified condition is demodulated and decoded to obtain the data D4.

Data obtained after specified processing is performed on the data D3 meeting a specified condition is demodulated and decoded to obtain the data D4.

Data obtained after specified processing is performed on the data D3 and meeting a specified condition is demodulated and decoded to obtain the data D4.

The specified condition may include at least one of: first Y data streams with larger Signal to Interference and Noise Ratio (SINR); and data streams with SINR greater than a specified threshold value. The Y is an integer greater than or equal to 1.

The specified processing may include: weighting; and the weighting may be scalar weighting, vector weighting, weighting using the SINR, etc.

In some implementation of the embodiment, the method may further include operation 404.

In operation 404, information is obtained from the data D4.

The information may include at least one of: payload information; user identity information; sequence information; sequence set information; and reference signal information.

In some implementation of the embodiment, the method may further include operation 405.

In operation 405, reconstruction is performed based on the data D4 to obtain data D5.

The operation that reconstruction is performed based on the data D4 to obtain data D5 may include that: encoding and modulation are performed on the data D4, then differential encoding is preformed, and then processing such as spreading or modulation is performed by using a sequence to obtain the data D5.

It is to be noted that the reconstruction processing described herein is similar to the corresponding processing process of the transmitter. During reconstruction, information obtained from the data D4 may be used for reconstruction.

In some implementation of the embodiment, the method may further include operation 406.

In operation 406, channel estimation is performed by using the data D5.

The operation that channel estimation is performed by using the data D5 may include that: the data D5 serves as a reference signal, and channel estimation is performed according to data received by a receiver to obtain a channel estimation result.

When the data D5 corresponding to multiple users is known, the data D5 corresponding to the multiple users may be used to implement multi-user joint channel estimation to obtain channel estimation results corresponding to the multiple users.

In some implementation of the embodiment, the method may further include operation 407.

In operation 407, interference of the data D5 is eliminated from data received by a receiver.

The data received by the receiver may include data received by each receiving antenna of the receiver.

The operation that interference of the data D5 is eliminated from data received by a receiver may include that: according to the data D5 and the channel estimation result, the interference of the data D5 is eliminated from the data received by the receiver.

The method may be used to implement receiving detection of multi-user grant-free and non-orthogonal transmission.

In some implementation of the embodiment, when data that is received correctly can be obtained by means of operation 403, subsequent operations are executed continuously; otherwise, i.e., when the data that is received correctly cannot be obtained, a receiving detection process of the receiver is ended.

In some implementation of the embodiment, after the completion of operation 407, the data received by the receiver is updated; and then, the method may restart from operation 401, to perform the receiving detection on other users or data streams that have not yet been identified and detected.

When the method is used to implement the grant-free solution, it is possible that the receiver does not know the sequence and the like used by the transmitter. In this situation, among the above operations at least operation 401 may be implemented by using a blind detection manner. For example, data received by multiple receiving antennas of the receiver is combined blindly according to a preset rule; respective candidate sequences are traversed to perform blind detection on the data D1; or, a sequence that may be used is identified from respective candidate sequences, and the identified sequence is used to perform the blind detection on the data D1.

Fifth Implementation Manner

Figure 9:
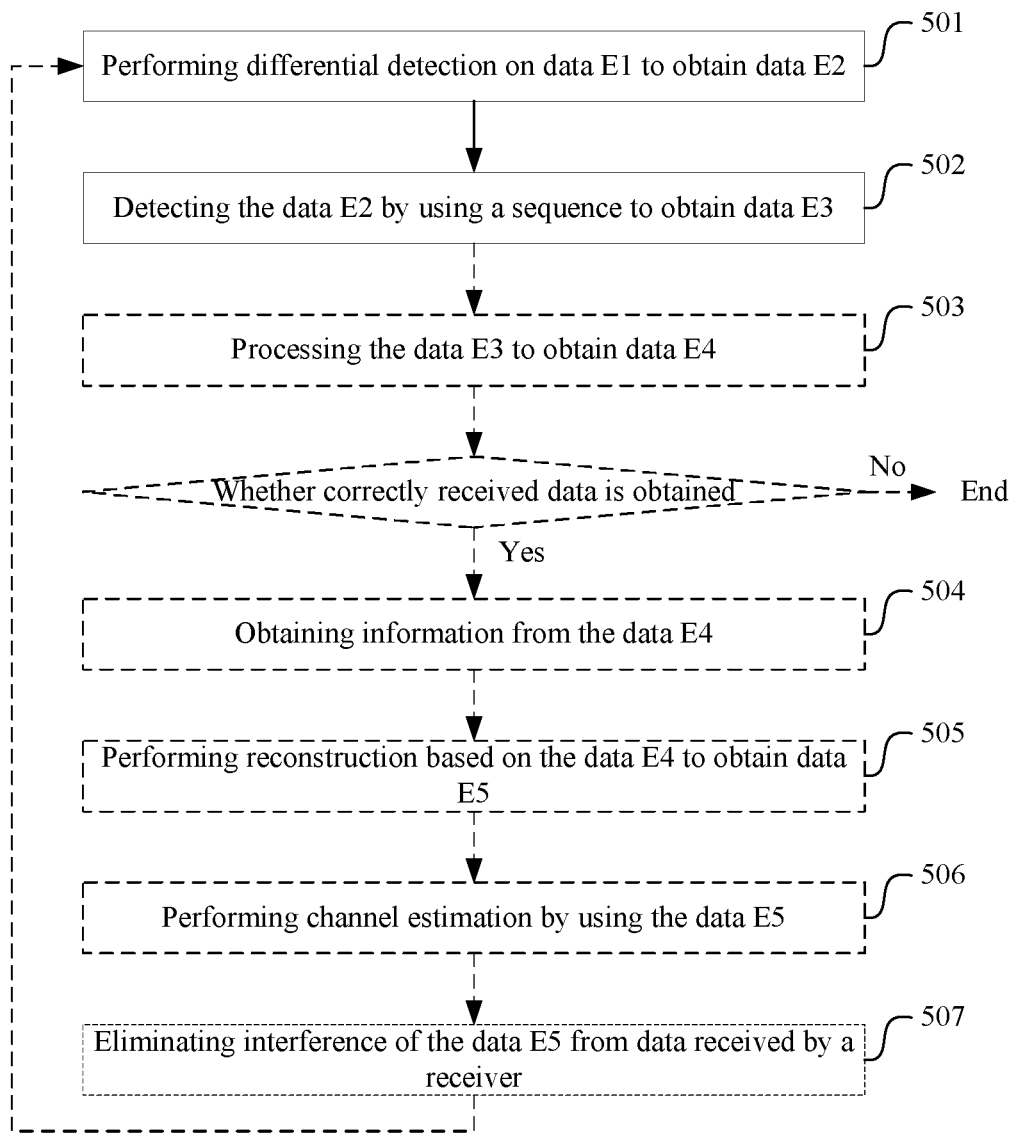
FIG. 9 is a fifth flowchart of a data processing method provided by an embodiment of the present disclosure.

This implementation manner provides a data processing method, which may be applied to a receiver, including but not limited to a base station receiver, a terminal receiver, etc. FIG. 9 is a fifth flowchart of a data processing method according to an embodiment of the present disclosure. As shown in FIG. 9, the method may include operations 501 and 502.

In operation 501, differential detection is performed on data E1 to obtain data E2.

The data E1 may include: data received by each receiving antenna of the receiver.

The operation that differential detection is performed on data E1 to obtain data E2 may include that: the differential detection is performed on the data E1 in a specified manner to obtain the data E2. The specified manner may include at least one of: frequency domain differential detection; time domain differential detection; time-frequency domain differential detection; and segmental differential detection.

In operation 502, the data E2 is detected by using a sequence to obtain data E3.

The sequence may include at least one of: a sequence in a sequence set; a sequence generated according to a preset rule; and a sequence identified, according to a sequence set and the data E2, from the sequence set. The sequence has a length of L, the L being an integer greater than 1.

The sequence set may include at least one of: a preset sequence set; and a sequence set generated according to a preset rule.

The operation that the data E2 is detected by using a sequence to obtain data E3 may include one of the following operations.

The data E2 is detected by using the sequence to obtain the data E3, for example, the data E2 is converted into a matrix M including L rows and N columns of data, and the matrix M is detected by using the sequence to obtain the data E3.

Data obtained by processing the data E2 is detected by using the sequence to obtain the data E3, for example, data corresponding to multiple receiving antennas in the data E2 is combined according to a preset rule, the obtained data is converted into a matrix M including L rows and N columns of data, and the matrix M is detected by using the sequence to obtain the data E3, the preset rule including a preset combining method and a preset combining vector. Alternatively, frequency offset compensation and/or time offset compensation is performed on the data E2, the obtained data is converted into a matrix M including L rows and N columns of data, and the matrix M is detected by using the sequence to obtain the data E3.

A correlation matrix is obtained according to the data E2, and the data E2 is detected by using the sequence and the correlation matrix to obtain the data E3, for example, the data E2 is converted into a matrix M including L rows and N columns of data, an autocorrelation matrix X of the matrix M is calculated, and the matrix M is detected by using the sequence and the autocorrelation matrix X to obtain the data E3.

A correlation matrix is obtained according to data obtained by processing the data E2, and the data obtained by processing the data E2 is detected by using the sequence and the correlation matrix to obtain the data E3, for example, data corresponding to multiple receiving antennas in the data E2 is combined according to a preset rule, the obtained data is converted into a matrix M including L rows and N columns of data, an autocorrelation matrix of the matrix M is calculated, and the matrix M is detected by using the sequence and the autocorrelation matrix X to obtain the data E3; or, frequency offset compensation and/or time offset compensation is performed on the data E2, the obtained data is converted into a matrix M including L rows and N columns of data, an autocorrelation matrix of the matrix M is calculated, and the matrix M is detected by using the sequence and the autocorrelation matrix X to obtain the data E3.

The L is a length of the sequence, and the N is an integer greater than or equal to 1.

In some implementation of the embodiment, the method may further include operation 503.

In operation 503, the data E3 is processed to obtain data E4.

The operation that the data E3 is processed to obtain data E4 may include one of the following operations.

The data E3 is demodulated and decoded to obtain the data E4.

Data obtained after specified processing is performed on the data E3 is demodulated and decoded to obtain the data E4.

The data E3 meeting a specified condition is demodulated and decoded to obtain the data E4.

Data obtained after specified processing is performed on the data E3 meeting a specified condition is demodulated and decoded to obtain the data E4.

Data obtained after specified processing is performed on the data E3 and meeting a specified condition is demodulated and decoded to obtain the data E4.

The specified condition may include at least one of: first Y data streams with larger SINR; and data streams with SINR greater than a specified threshold value. The Y is an integer greater than or equal to 1.

The specified processing at least may include: weighting; and the weighting may be scalar weighting, vector weighting, weighting using the SINR, etc.

In some implementation of the embodiment, the method may further include operation 504.

In operation 504, information is obtained from the data E4.

The information may include at least one of: payload information; user identity information; sequence information; sequence set information; and reference signal information.

In some implementation of the embodiment, the method may further include operation 505.

In operation 505, reconstruction is performed based on the data E4 to obtain data E5.

The operation that reconstruction is performed based on the data E4 to obtain data E5 may include that: encoding and modulation is performed on the data E4, then processing such as spreading or modulation by using a sequence is performed, and then differential encoding is performed to obtain the data E5.

It is to be noted that the reconstruction processing described herein is similar to the corresponding processing process of the transmitter. During reconstruction, information obtained from the data E4 may be used for reconstruction.

In some implementation of the embodiment, the method may further include operation 506.

In operation 506, channel estimation is performed by using the data E5.

The operation that channel estimation is performed by using the data E5 may include that: the data E5 serves as a reference signal, and channel estimation is performed according to data received by a receiver to obtain a channel estimation result.

When the data E5 corresponding to multiple users is known, the data E5 corresponding to the multiple users may be used to implement multi-user joint channel estimation to obtain channel estimation results corresponding to the multiple users.

In some implementation of the embodiment, the method may further include operation 507.

In operation 507, interference of the data E5 is eliminated from data received by a receiver.

The data received by the receiver may include data received by each receiving antenna of the receiver.

The operation that interference of the data E5 is eliminated from data received by a receiver may include that: according to the data E5 and the channel estimation result, the interference of the data E5 is eliminated from the data received by the receiver.

The method may be used to implement receiving detection of multi-user grant-free and non-orthogonal transmission.

In some implementation of the embodiment, when data that is received correctly can be obtained by means of operation 503, subsequent operations are executed continuously; otherwise, i.e., when the data that is received correctly cannot be obtained, a receiving detection process of the receiver is ended.

In some implementation of the embodiment, after the completion of operation 507, the data received by the receiver is updated; and then, the method may restart from operation 501, to perform the receiving detection on other users or data streams that have not yet been identified and detected.

When the method is used to implement the grant-free solution, it is possible that the receiver does not know the sequence and the like used by the transmitter. In this situation, among the above operations at least operation 502 may be implemented by using a blind detection manner. For example, data received by multiple receiving antennas of the receiver is combined blindly according to a preset rule; respective candidate sequences are traversed to perform blind detection on the data E2; or, a sequence that may be used is identified from respective candidate sequences, and the identified sequence is used to perform the blind detection on the data E2.

Sixth Implementation Manner

Figure 10:
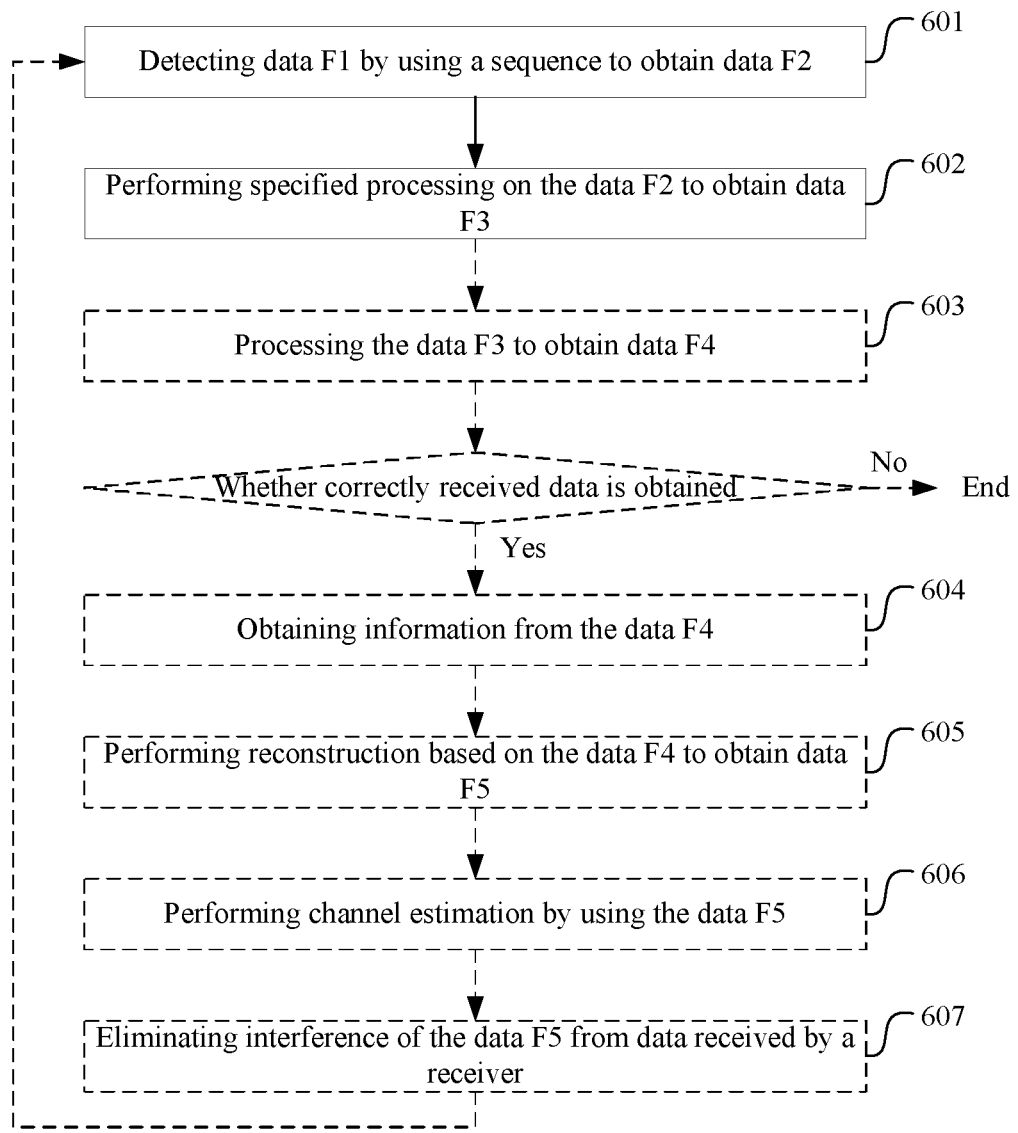
FIG. 10 is a sixth flowchart of a data processing method provided by an embodiment of the present disclosure.

This implementation manner provides a data processing method, which may be applied to a receiver, including but not limited to a base station receiver, a terminal receiver, etc. FIG. 10 is a sixth flowchart of a data processing method according to an embodiment of the present disclosure. As shown in FIG. 10, the method may include operations 601 and 602.

In operation 601, data F1 is detected by using a sequence to obtain data F2.

The data F1 may include at least one of: data received by each receiving antenna of the receiver; and data obtained by performing specified processing on data received by multiple receiving antennas of the receiver.

The specified processing at least may include one of: combining according to a preset rule, frequency offset compensation and time offset compensation. The preset rule may include a preset combining method and a preset combining vector.

The sequence may include at least one of: a sequence in a sequence set; a sequence generated according to a preset rule; and a sequence identified, according to a sequence set and the data F1, from the sequence set. The sequence has a length of L, the L being an integer greater than 1.

The sequence set may include at least one of: a preset sequence set; and a sequence set generated according to a preset rule.

The operation that data F1 is detected by using a sequence to obtain data F2 may include one of the following operations.

The data F1 is detected by using the sequence to obtain the data F2, for example, the data F1 is converted into a matrix M including L rows and N columns of data, and the matrix M is detected by using the sequence to obtain the data F2.

Data obtained by processing the data F1 is detected by using the sequence to obtain the data F2, for example, data corresponding to multiple receiving antennas in the data F1 is combined according to a preset rule, the obtained data is converted into a matrix M including L rows and N columns of data, and the matrix M is detected by using the sequence to obtain the data F2, the preset rule including a preset combining method and a preset combining vector; or, frequency offset compensation and/or time offset compensation is performed on the data F1, the obtained data is converted into a matrix M including L rows and N columns of data, and the matrix M is detected by using the sequence to obtain the data F2.

A correlation matrix is obtained according to the data F1, and the data F1 is detected by using the sequence and the correlation matrix to obtain the data F2, for example, the data F1 is converted into a matrix M including L rows and N columns of data, an autocorrelation matrix X of the matrix M is calculated, and the matrix M is detected by using the sequence and the autocorrelation matrix X to obtain the data F2.

A correlation matrix is obtained according to data obtained by processing the data F1, and the data obtained by processing the data F1 is detected by using the sequence and the correlation matrix to obtain the data F2, for example, data corresponding to multiple receiving antennas in the data F1 is combined according to a preset rule, the obtained data is converted into a matrix M including L rows and N columns of data, an autocorrelation matrix of the matrix M is calculated, and the matrix M is detected by using the sequence and the autocorrelation matrix X to obtain the data F2; or, frequency offset compensation and/or time offset compensation is performed on the data F1, the obtained data is converted into a matrix M including L rows and N columns of data, an autocorrelation matrix of the matrix M is calculated, and the matrix M is detected by using the sequence and the autocorrelation matrix X to obtain the data F2.

The L is a length of the sequence, and the N is an integer greater than or equal to 1.

In operation 602, specified processing is performed on the data F2 to obtain data F3.

The specified processing may include: channel compensation or channel equalization.

The operation that specified processing is performed on the data F2 to obtain data F3 may include one of the following operations.

Channel information is obtained by using the data F2, and channel compensation is performed on the data F2 to obtain the data F3.

Channel information is obtained by using a reference signal, and channel compensation is performed on the data F2 to obtain the data F3.

Channel information is obtained by using a reference signal and the data F2, and channel compensation is performed on the data F2 to obtain the data F3.

Channel information is obtained by using a reference signal in the data F2, and channel compensation is performed on the data F2 to obtain the data F3.

Channel information is obtained by using a reference signal in the data F2, and channel compensation is performed on a data symbol in the data F2 to obtain the data F3.

Channel information is obtained by using a reference signal and a data symbol in the data F2, and channel compensation is performed on the data F2 to obtain the data F3.

Channel information is obtained by using a reference signal and a data symbol in the data F2, and channel compensation is performed on the data symbol in the data F2 to obtain the data F3.

The reference signal is a reference signal received and detected on a reference signal bearing transmission resource, and the data symbol is a data symbol received and detected on a data symbol bearing transmission resource.

The channel compensation may include at least one of: channel attenuation amplitude compensation; and channel rotation phase compensation. Additionally, the channel compensation may further include at least one of: frequency offset compensation and time offset compensation.

The channel compensation is intended to eliminate an influence of a channel and may also be referred to as the channel equalization.

In some implementation of the embodiment, the method may further include operation 603.

In operation 603, the data F3 is processed to obtain data F4.

The operation that the data F3 is processed to obtain data F4 may include one of the following operations.

The data F3 is demodulated and decoded to obtain the data F4.

Data obtained after specified processing is performed on the data F3 is demodulated and decoded to obtain the data F4.

The data F3 meeting a specified condition is demodulated and decoded to obtain the data F4.

Data obtained after specified processing is performed on the data F3 meeting a specified condition is demodulated and decoded to obtain the data F4.

Data obtained after specified processing is performed on the data F3 and meeting a specified condition is demodulated and decoded to obtain the data F4.

The specified condition may include at least one of: first Y data streams with larger SINR; and data streams with SINR greater than a specified threshold value. The Y is an integer greater than or equal to 1.

The specified processing may include at least one of: negating and weighting; and the weighting may be scalar weighting, vector weighting, weighting using the SINR, etc.

In some implementation of the embodiment, the method may further include operation 604.

In operation 604, information is obtained from the data F4.

The information may include at least one of: payload information; user identity information; sequence information; sequence set information; and reference signal information.

In some implementation of the embodiment, the method may further include operation 605.

In operation 605, reconstruction is performed based on the data F4 to obtain data F5.

The operation that reconstruction is performed based on the data F4 to obtain data F5 may include one of the followings: encoding and modulation is performed on the data E4, and then processing such as spreading or modulation by using a sequence is performed to obtain the data F5; and processing such as spreading or modulation by using a sequence is performed on the data F4 to obtain the data F5.

It is to be noted that the reconstruction processing described herein is similar to the corresponding processing process of the transmitter. During reconstruction, information obtained from the data F4 may be used for reconstruction.

In some implementation of the embodiment, the method may further include operation 606.

In operation 606, channel estimation is performed by using the data F5.

The operation that channel estimation is performed by using the data F5 may include that: the data F5 serves as a reference signal, and channel estimation is performed according to data received by a receiver to obtain a channel estimation result.

When the data F5 corresponding to multiple users is known, the data F5 corresponding to the multiple users may be used to implement multi-user joint channel estimation to obtain channel estimation results corresponding to the multiple users.

In some implementation of the embodiment, the method may further include operation 607.

In operation 607, interference of the data F5 is eliminated from data received by a receiver.

The data received by the receiver may include data received by each receiving antenna of the receiver.

The operation that interference of the data F5 is eliminated from data received by a receiver may include that: according to the data F5 and the channel estimation result, the interference of the data F5 is eliminated from the data received by the receiver.

The method may be used to implement receiving detection of multi-user grant-free and non-orthogonal transmission.

In some implementation of the embodiment, when data that is received correctly may be obtained by means of operation 603, subsequent operations are executed continuously; otherwise, i.e., when the data that is received correctly cannot be obtained, a receiving detection process of the receiver is ended.

In some implementation of the embodiment, after the completion of operation 607, the data received by the receiver is updated; and then, the method may restart from operation 601, to perform the receiving detection on other users or data streams that have not yet been identified and detected.

When the method is used to implement the grant-free solution, it is possible that the receiver does not know the sequence, the reference signal and the like used by the transmitter. In this situation, among the above operations at least operation 601 and operation 602 may be implemented by using a blind detection manner. For example, data received by multiple receiving antennas of the receiver is combined blindly according to a preset rule; respective candidate sequences are traversed to perform blind detection on the data F1; or, a sequence that may be used is identified from respective candidate sequences, and the identified sequence is used to perform the blind detection on the data F1; and each reference signal is traversed to perform the blind detection on channel information; and blind estimation is performed on the channel information by using the data F2.

The embodiment of the present disclosure provides a data processing method. In the method, a transmitter performs differential encoding on data first and then performs spreading or modulation processing by using a sequence, and correspondingly, a receiver detects received data by using a sequence first and then performs differential detection; or, the transmitter performs the spreading or modulation processing on the data first and then performs the differential encoding, and correspondingly, the receives performs the differential detection on the received data first and then performs a detection by using a sequence. The method has the following beneficial effects.

(1) The method performs the spreading or modulation processing by using the sequence, which is helpful for the receiver to implement identification and detection on a user or a data stream; and a blind detection manner may be used for implementation.

(2) The method uses the differential encoding, which is helpful for the receiver to eliminate an influence of a channel by means of the differential detection; and only a small number of reference signals are required, the complex channel estimation and equalization may be prevented, the occupation for vast resource overhead due to the use of a great number of preamble sequences, pilot sequences or reference signals or the like may be prevented, and a good system transmission efficiency and a low receiver complexity are achieved.

Therefore, the data processing method provided by the embodiment of the present disclosure may be used to implement more flexible and efficient grant-free and non-orthogonal transmission, and has good system transmission efficiency and low receiver complexity.

First Application Example

Figure 11:
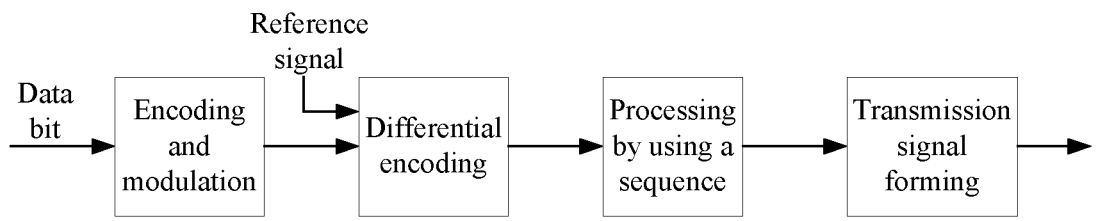
FIG. 11 is a first time sequence diagram for data processing provided by an embodiment of the present disclosure.

This application example provides a data processing method, with a schematic diagram of a processing process shown in FIG. 11. FIG. 11 is a first time sequence diagram for data processing provided by an embodiment of the present disclosure.

In this application example, a user terminal first performs encoding and modulation on a to-be-transmitted data bit to generate a to-be-transmitted data symbol.

The to-be-transmitted data bit may include a data bit of a to-be-transmitted payload (such as traffic data), a data bit carrying user identity information (such as a user identity code), and a data bit carrying information of a sequence used by a user (such as a sequence index).

The to-be-transmitted data bit may further include a data bit carrying information of a sequence set where the sequence used by the user is located (such as a sequence set index), for example, when multiple available sequence sets exist, the user may select one sequence set randomly and determine the used sequence from the sequence set, that is, the sequence used by the user may be from any sequence set.

The encoding may include, for example, a convolutional code, a Turbo code, a Low Density Parity Check (LDPC), and other channel codes. The modulation may include, for example, Binary Phase Shift Keying (BPSK), Quadrature Phase Shift Keying (QPSK), Quadrature Amplitude Modulation (QAM) and other amplitude phase modulation.

Then, the user terminal performs differential encoding on the to-be-transmitted data symbol according to a reference signal.

The reference signal may also be referred to as a reference symbol, a pilot signal, a pilot symbol, a pilot sequence, a training symbol, a training sequence, etc. The differential encoding may also be referred to as differential modulation, for example, Differential Binary Phase Shift Keying (DBPSK) or 2DPSK may be formed with combined use of the differential encoding and the BPSK.

It is to be noted that the to-be-transmitted data bit may further include a data bit carrying information of the reference signal, for example, if the reference signal is determined according to the user identity information or determined from the reference signal set, the to-be-transmitted data bit may include the information of the reference signal, so that the receiver performs, upon the receiving detection, reconstruction and interference cancellation on the data, transmitted by the transmitter, by using the information. The receiver does not need to know the information of the reference signal in differential detection. For multi-user grant-free and non-orthogonal transmission, it is further possible that other user terminals transmit on a same time-frequency resource; in this sense, the receiver may first perform the reconstruction and interference cancellation on data that has already been received and detected correctly, and then identifies and detects other users. At this time, when the receiver performs the reconstruction and interference cancellation on the data that has already been received and detected correctly, the receiver needs to know the information of the reference signal and perform the differential encoding and the like according to a similar processing process when the user terminal transmits the data. The determination of the reference signal according to the user identity information or the determination of the reference signal from the reference signal set may introduce a disparity and a randomness to the reference signal, which is helpful to form a signal of the transmitter and randomize the interference of the receiver, or may be used to implement the differential encoding and signal forming at a low peak-to-average ratio, for example, select an appropriate reference signal so that the signal formed after the differential encoding has low peak-to-average ratio.

If the reference signal is preset, for example, the reference signal is 1, the to-be-transmitted data bit may not include the information of the reference signal or reference symbol.

The determination of the reference signal according to the user identity information may be, for example, to generate and select the reference signal according to the user identity information or determine the reference signal according to a preset rule; and the determination of the reference signal from the reference signal set may be, for example, to randomly select the reference signal from the reference signal set or determine the reference signal according to a preset rule.

The user terminal may perform the differential encoding on the to-be-transmitted data symbol according to the reference signal in at least one of the following manners.

(1) Frequency domain differential encoding: with an Orthogonal Frequency Division Multiplexing (OFDM) system as an example, supposing that a user terminal uses one Physical Resource Block (PRB) for transmission, and the PRB has a frequency domain including 12 sub-carriers with indexes of 0-11 and a time domain including 14 symbols with indexes of 0-13, so for frequency domain differential encoding, each symbol on a 0-th sub-carrier may be used as a reference symbol and symbols on other sub-carriers may be used as data symbols, then differential encoding is performed according to $sym(n, i)=sym(n-1, i)*sym(n, i)$, wherein the n is a sub-carrier index and the n is greater than 0, the i is a symbol index, and the $sym(n, i)$ denotes a symbol at an n-th sub-carrier and an i-th symbol; and when n=1, $sym(n-1, i)$, that is, the $sym(0, i)$ denotes a reference symbol at the 0-th sub-carrier and the i-th symbol, and the frequency domain differential encoding may use each reference symbol on the 0-th sub-carrier as a reference or starting point for the differential encoding.

(2) Time domain differential encoding: supposing that a user terminal uses one PRB for transmission, and the PRB has a frequency domain including 12 sub-carriers with indexes of 0-11 and a time domain including 14 symbols with indexes of 0-13, so for time domain differential encoding, a 0-th symbol on each sub-carrier may be used as a reference symbol and other symbols on each sub-carrier may be used as data symbols, and differential encoding is performed according to $sym(n, i)=sym(n, i-1)*sym(n, i)$, wherein the n is a sub-carrier index, the i is a symbol index and the i is greater than 0; or, supposing that the user terminal uses one sub-carrier for single-tone transmission, and a resource unit has a frequency domain only including one sub-carrier and a time domain including T symbols with indexes of 0 to T-1, the time domain differential encoding may use a 0-th symbol as a reference signal and other symbols as data symbols, and perform the differential encoding according to $sym(i)=sym(i-1)*sym(i)$, wherein the i is a symbol index and the i is greater than 0; that is, the time domain differential encoding may use the 0-th symbol (that is, the reference signal) on each sub-carrier as a reference or a starting point for the differential encoding.

(3) Time-frequency domain differential encoding: the time-frequency domain differential encoding may be the frequency domain differential encoding first and then the time domain differential encoding, and may also be the time domain differential encoding first and then the frequency domain differential encoding. Supposing that a user terminal uses one PRB for transmission, and the PRB has a frequency domain including 12 sub-carriers with indexes of 0-11 and a time domain including 14 symbols with indexes of 0-13, the time-frequency domain differential encoding may use a 0-th symbol on a 0-th sub-carrier as a reference signal and other symbols on each sub-carrier as data symbols. If the frequency domain differential encoding is performed first and then the time domain differential encoding is performed, the frequency domain differential encoding may be performed first according to $sym(n, 0)=sym(n-1, 0)*sym(n, 0)$, wherein the n is a sub-carrier index and then is greater than 0, and at this time, the symbol index is 0; and then, the time domain differential encoding is performed according to $sym(n, i)=sym(n, i-1)*sym(n, i)$, wherein the n is a sub-carrier index, the i is a symbol index and the i is greater than 0. If the time domain differential encoding is performed first and then the frequency domain differential encoding is performed, the time domain differential encoding may be performed first according to sym(0, i)=sym(0, i−1)*sym(0, i), wherein the i is a symbol index and the i is greater than 0, and at this time, the sub-carrier index is 0; and then, the frequency domain differential encoding is performed according to sym(n, i)=sym(n−1, i)*sym(n, i), wherein the n is a sub-carrier index and the n is greater than 0, and the i is a symbol index; that is, the time-frequency domain differential encoding may use the 0-th symbol (that is the reference signal) on the 0-th sub-carrier as a reference or starting point for the differential encoding.

(4) Segmental differential encoding: the segmental differential encoding may be used in cooperation with the frequency domain differential encoding, the time domain differential encoding, or the time-frequency domain differential encoding, to implement frequency domain segmental differential encoding, time domain segmental differential encoding, or time-frequency domain segmental differential encoding. The specific processing process is similar to the above description and will no longer be repeated.

Then, the user terminal processes, by using a sequence, a symbol obtained after the differential encoding.

The sequence may also be referred to as a code. The sequence used by the user terminal has a length of L, the L being an integer greater than 1. Moreover, the sequence used by the user terminal may be randomly selected from a sequence set, or obtained from a sequence set according to a preset rule, or obtained from a sequence set according to system configuration information, or randomly generated by the user terminal, or generated by the user terminal according to a preset rule.

The sequence set may be a sequence set including W sequences having a length of L. The sequences in the sequence set are orthogonal, non-orthogonal, of low cross-correlation or of equal cross-correlation. The sequence set may be preset, or generated according to a preset rule. For instance, in an exemplary sequence set, a sequence element comes from a set {1+1i, −1+1i, −1−1i, 1−1i}. Further, it may further be appropriate to fix an element at a specified position of each sequence as a specified value, for example, a first element in each sequence is fixed as 1+1i, other elements of each sequence may be randomly selected from a value set, and then 64 sequences having a length of 4 may be obtained in total. In another exemplary sequence set, a sequence element comes from a set {1, 1i, −1, −1i}. Further, it may further be appropriate to fix an element at a specified position of each sequence as a specified value, for example, a first element in each sequence is fixed as 1, other elements of each sequence may be randomly selected from a value set, and then 64 sequences having a length of 4 may also be obtained in total. Another exemplary sequence set generation method is further provided. The method uses two small sequence sets to generate a required sequence set, for example, a sequence set 1 is a Hadamard sequence set including 4 sequences having a length of 4, a sequence set 2 is a sequence set including V sequences having a length of 4, and by performing point multiplication operation on each sequence in the sequence set 2 and each sequence in the sequence set 1, a sequence set including 4*V sequences having a length of 4 may be obtained.

The sequence used by the user terminal may be obtained from a sequence set according to a preset rule, for example, a sequence index is determined according to information such as an identity code and/or a serving cell identification code and the like of the user terminal, and the used sequence is obtained from the sequence set.

The sequence used by the user terminal may be obtained from a sequence set according to system configuration information, for example, the used sequence is obtained from the sequence set according to system pre-configuration, and semi-static and dynamic configuration information.

The sequence used by the user terminal may be randomly generated, for example, each element of the sequence may be randomly selected from a value set {1, 1i, −1, −1i}; or an element at a specified position of the sequence is fixed as a specified value, for example, a first element of the sequence is fixed as 1, and other elements of the sequence may be randomly selected from the value set {1, 1i, −1, −1i}.

The sequence used by the user terminal may be generated according to a preset rule, for example, the user terminal selects one sequence from a sequence set 1, selects one sequence from a sequence set 2, and performs point multiplication on the two sequences to obtain the sequence used by the user terminal.

The sequence used by the user terminal may be a sequence of real numbers, may also be a sequence of complex numbers, and may further be a sequence containing at least one 0 element.

The length L of the sequence used by the user terminal may be a small value, for example, the L is 2, 3, 4, 6, 8, 12 or 16, etc.

Energy normalization may further be performed on the sequence in the sequence set, so that total energy of each sequence is 1 or L. Correspondingly, the sequence used by the user terminal may be a sequence of which total energy is normalized as 1 or L.

The operation that the user terminal processes, by using a sequence, a symbol obtained after the differential encoding may include that: the user terminal performs, by using the sequence, spreading processing or modulation processing on the symbol obtained after the differential encoding.

The operation that the user terminal processes, by using a sequence, a symbol obtained after the differential encoding may further include that: the reference signal and the to-be-transmitted data symbol are processed.

As the sequence has the length of L, when the user terminal processes, by using the sequence, the symbol obtained after the differential encoding, L symbols are obtained.

Then, the user terminal forms, on a specified time frequency resource based on a symbol processed by using the sequence, a transmission signal to be transmitted. The specified time frequency resource may be selected randomly by the user terminal, or determined by the user terminal according to a preset rule, or configured by a system. The system configuration may use pre-configuration, semi-static configuration or dynamic configuration, etc.

In this application example, the to-be-transmitted data bit may carry the user identity information, the information of the sequence used by the user, the information of a sequence set where the sequence used by the user is located, the information of the reference signal and the like in an explicit or implicit manner. The explicit manner is to carry the information via an explicit data bit, while the implicit manner is to carry the information via a data bit having other functions or meanings.

The data processing method provided by this application example may be applied to K transmitters, the K being an integer greater than or equal to 1. The K transmitters respectively perform the differential encoding on data, then perform the spreading or modulation processing by using a sequence, and form, on a specified time frequency resource based on the processed data, a transmission signal to be transmitted. The sequence used by the K transmitters may be selected randomly or generated randomly, and may be orthogonal, non-orthogonal, of low cross-correlation or of equal cross-correlation. The specified time frequency resource used by the K transmitters may be selected randomly, or may be the same time frequency resource. The data processing method provided by this application example may be used to implement multi-user grant-free and non-orthogonal transmission.

Second Application Example

Figure 12:
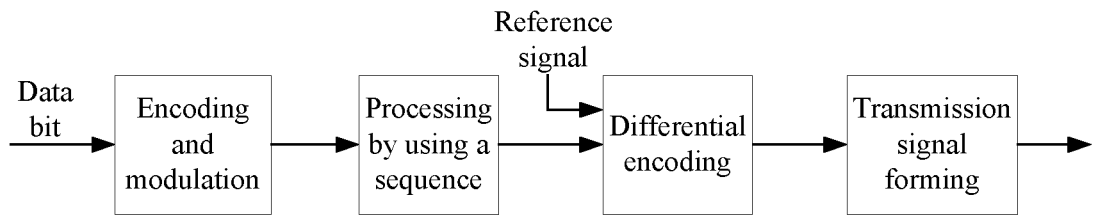
FIG. 12 is a second time sequence diagram for data processing provided by an embodiment of the present disclosure.
Figure 13:
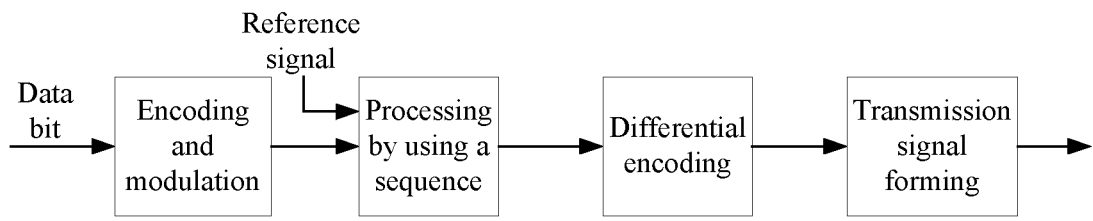
FIG. 13 is a third time sequence diagram for data processing provided by an embodiment of the present disclosure.

This application example provides a data processing method, with a schematic diagram of a processing process shown in FIG. 12 and FIG. 13. FIG. 12 is a second time sequence diagram for data processing provided by an embodiment of the present disclosure. FIG. 13 is a third time sequence diagram for data processing provided by an embodiment of the present disclosure.

In this application example, a user terminal first performs encoding and modulation on a to-be-transmitted data bit to generate a to-be-transmitted data symbol.

The to-be-transmitted data bit may include a data bit of a to-be-transmitted payload, a data bit carrying user identity information, and a data bit carrying information of a sequence used by a user; and may further include a data bit carrying information of a sequence set where the sequence used by the user is located, and the specific content is similar to the description of the above implementation manner and will no longer be repeated.

Then, the user terminal processes a to-be-transmitted symbol by using a sequence.

The to-be-transmitted symbol may include a to-be-transmitted data symbol. As shown in FIG. 12, the user terminal processes, by using a sequence used by the user terminal, the to-be-transmitted data symbol obtained after the encoding and modulation. This manner does not process a reference signal by using the sequence, so a resource overhead may be saved.

Or, the to-be-transmitted symbol may include a reference signal and a to-be-transmitted data symbol. As shown in FIG. 13, the user terminal processes, by using a sequence used by the user terminal, the reference signal and the to-be-transmitted data symbol obtained after the encoding and modulation. This manner processes the reference signal by using the sequence, which is helpful for resource mapping.

The sequence used by the user terminal has a length of L, the L being an integer greater than 1. Moreover, the sequence used by the user terminal may be randomly selected from a sequence set, or obtained from a sequence set according to a preset rule, or obtained from a sequence set according to system configuration information, or randomly generated by the user terminal, or generated by the user terminal according to a preset rule, and the specific content is similar to the description of the above implementation manner and will no longer be repeated.

The operation that the user terminal processes a to-be-transmitted symbol by using a sequence may include that: the user terminal performs spreading processing or modulation processing on the to-be-transmitted symbol by using the sequence.

Then, the user terminal performs, according to a reference signal, differential encoding on a symbol processed by using the sequence.

It is to be noted that the to-be-transmitted data bit may further include a data bit carrying information of the reference signal, so that a receiver performs, by using the information, reconstruction and interference cancellation on data transmitted by a transmitter; and the specific content is similar to the description of the above implementation manner and will no longer be repeated.

The user terminal performs, according to the reference signal, the differential encoding on the symbol processed by using the sequence, which may use at least one of: frequency domain differential encoding; time domain differential encoding; time-frequency domain differential encoding; and segmental differential encoding; and the specific content is similar to the description of the above implementation manner and will no longer be repeated.

In the processing process shown in FIG. 13, the user terminal processes the reference signal and the data symbol by using the sequence to obtain processed reference signal and data signal, and the total number of symbols is L times of the original number. The differential encoding process may be to perform the differential encoding on the processed data symbol according to the processed reference signal, or perform the differential encoding on the processed reference signal and data symbol according to the processed reference signal.

Then, the user terminal forms, on a specified time frequency resource based on the symbol processed by using the sequence, a transmission signal to be transmitted. The specified time frequency resource may be selected randomly by the user terminal, or determined by the user terminal according to a preset rule, or configured by a system. The system configuration may use pre-configuration, semi-static configuration or dynamic configuration, etc.

The data processing method provided by this application example may be applied to K transmitters, the K being an integer greater than or equal to 1. The K transmitters respectively perform the spreading or modulation processing on data by using a sequence, then perform the differential encoding and form, on a specified time frequency resource based on the processed data, a transmission signal to be transmitted. The sequence used by the K transmitters may be selected randomly or generated randomly, and may be orthogonal, non-orthogonal, of low cross-correlation or of equal cross-correlation. The specified time frequency resource used by the K transmitters may be selected randomly, or may be the same time frequency resource. The method may be used to implement multi-user grant-free and non-orthogonal transmission.

Third Application Example

Figure 14:
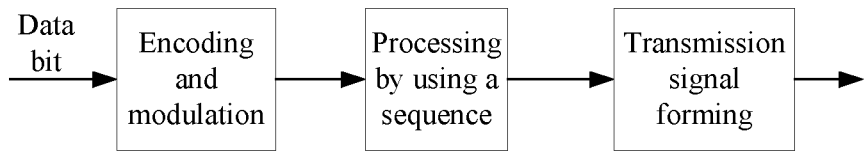
FIG. 14 is a fourth time sequence diagram for data processing provided by an embodiment of the present disclosure.
Figure 15:
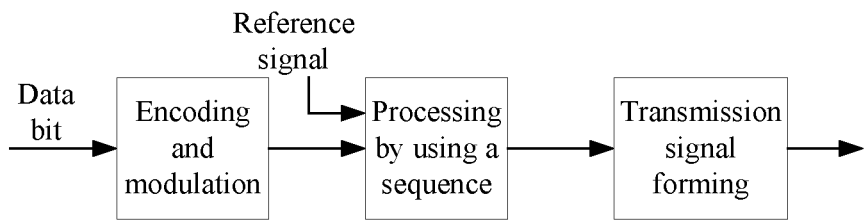
FIG. 15 is a fifth time sequence diagram for data processing provided by an embodiment of the present disclosure.

This application example provides a data processing method, with a schematic diagram of a processing process shown in FIG. 14 and FIG. 15. FIG. 14 is a fourth time sequence diagram for data processing provided by an embodiment of the present disclosure. FIG. 15 is a fifth time sequence diagram for data processing provided by an embodiment of the present disclosure.

In this application example, a user terminal first performs encoding and modulation on a to-be-transmitted data bit to generate a to-be-transmitted data symbol.

The to-be-transmitted data bit may include a data bit of a to-be-transmitted payload, a data bit carrying user identity information, and a data bit carrying information of a sequence used by a user; and may further include a data bit carrying information of a sequence set where the sequence used by the user is located, and the specific content is similar to the description of the above implementation manner and will no longer be repeated.

Then, the user terminal processes a to-be-transmitted symbol by using a sequence.

The to-be-transmitted symbol may include a to-be-transmitted data symbol. As shown in FIG. 14, the user terminal processes, by using a sequence used by the user terminal, the to-be-transmitted data symbol obtained after the encoding and modulation.

Or, the to-be-transmitted symbol may include a reference signal and a to-be-transmitted data symbol. As shown in FIG. 15, the user terminal processes, by using the sequence, the reference signal and the to-be-transmitted data symbol obtained after the encoding and modulation. In this situation, the to-be-transmitted data bit may further include a data bit carrying information of the reference signal, so that a receiver performs, by using the information, reconstruction and interference cancellation on data transmitted by a transmitter upon receiving and detecting; and the specific content is similar to the description of the above implementation manner and will no longer be repeated.

The sequence used by the user terminal has a length of L, the L being an integer greater than 1. Moreover, the sequence used by the user terminal may be randomly selected from a sequence set, or obtained from a sequence set according to a preset rule, or obtained from a sequence set according to system configuration information, or randomly generated by the user terminal, or generated by the user terminal according to a preset rule, and the specific content is similar to the description of the above implementation manner and will no longer be repeated.

The operation that the user terminal processes a to-be-transmitted symbol by using a sequence may include that: the user terminal performs spreading processing or modulation processing on the to-be-transmitted symbol by using the sequence.

Then, the user terminal forms, on a specified time frequency resource based on a symbol processed by using the sequence, a transmission signal to be transmitted. The specified time frequency resource may be selected randomly by the user terminal, or determined by the user terminal according to a preset rule, or configured by a system. The system configuration may use pre-configuration, semi-static configuration or dynamic configuration, etc.

The data processing method provided by this application example may be applied to K transmitters, the K being an integer greater than or equal to 1. The K transmitters respectively perform the spreading or modulation processing on data by using a sequence, and then form, on a specified time frequency resource based on the processed data, a transmission signal to be transmitted. The sequence used by the K transmitters may be selected randomly or generated randomly, and may be orthogonal, non-orthogonal, of low cross-correlation or of equal cross-correlation. The specified time frequency resource used by the K transmitters may be selected randomly, or may be the same time frequency resource. The method may be used to implement multi-user grant-free and non-orthogonal transmission.

Fourth Application Example

This application example provides a data processing method.

In this application example, a base station receiver first detects received data by using a sequence.

The data received by the base station receiver may include at least one of: data received by each receiving antenna of the receiver; and data obtained by combining, according to a preset rule, data that is received by multiple receiving antennas of the receiver.

The preset rule may include a preset combining method, a preset combining vector, etc. For example, supposing that the receiver has two receiving antennas, the preset combining vector may include at least one of: (1, 0), (0, 1), (1/sqrt(2), 1/sqrt(2)), (1/sqrt(2), −1/sqrt(2)), (1/sqrt(2), 1i/sqrt(2)), and (1/sqrt(2), −1i/sqrt(2)), wherein the sqrt( ) denotes square root operation; and data received by the two receiving antennas of the receiver is weighted according to the preset combining vector and then added together to obtain combined data. Herein, the combining according to the preset rule may be viewed as a blind combining processing.

The operation that a base station receiver detects received data by using a sequence may include that: the received data is converted into a matrix M including L rows and N columns of data, and the matrix M is detected by using the sequence S; or, the received data is converted into a matrix M including L rows and N columns of data, an autocorrelation matrix X of the matrix M is calculated, and the matrix M is detected by using the sequence S and the autocorrelation matrix X. The L is a length of the sequence. Each column in the L rows and N columns of data may include L pieces of data, and the L pieces of data are corresponding to L symbols obtained after a transmitter processes one symbol by using a sequence having a length of L, which indicates that the receiver receives the L pieces of data after the L symbols are transmitted via a channel. When multiple transmitters use a same time frequency resource for transmission, the L pieces of data received by the receiver are superposed data after the L symbols respectively transmitted by the multiple transmitters are transmitted via the channel.

In some exemplary implementation, the matrix M is detected by using the sequence S. For example, the sequence S has a length of L, may include L elements and may be described as a vector of L*1; the sequence S is subjected to conjugate transpose to obtain an S', and the S' is a vector of 1*L; and then, matrix multiplication operation is performed on the S' and the matrix M, so that a detection result including 1*N pieces of data may be obtained.

The matrix M is detected by using the sequence S and the autocorrelation matrix X. For example, the sequence S is subjected to conjugate transpose to obtain a vector S' of 1*L, the autocorrelation matrix X is an L*L matrix, an inverse matrix inv(X) of the autocorrelation matrix X is calculated, and matrix multiplication operation is performed on the S', the inverse matrix inv(X) and the matrix M, so that a detection result including 1*N pieces of data may be obtained.

The sequence used by the base station receiver at least may include one of: a sequence in a sequence set; a sequence generated according to a preset rule; and a sequence identified, according to a sequence set and the received data, from the sequence set.

The sequence set may be a sequence set including W sequences having a length of L. The sequences in the sequence set are orthogonal, non-orthogonal, of low cross-correlation or of equal cross-correlation. The sequence set may be preset, or generated according to a preset rule. For instance, in an exemplary sequence set, a sequence element comes from a set {1+1i, −1+1i, −1−1i, 1−1i}, and an element at a specified position of each sequence is fixed as a specified value, for example, a first element in each sequence is fixed as 1+1i, other elements of each sequence may be randomly selected from a value set, and then 64 sequences having a length of 4 may be obtained in total. In another exemplary sequence set, a sequence element comes from a set {1, 1i, −1, −1i}, and an element at a specified position of each sequence is fixed as a specified value, for example, a first element in each sequence is fixed as 1, other elements of each sequence may be randomly selected from a value set, and then 64 sequences having a length of 4 may also be obtained in total. Another exemplary sequence set generation method is further provided. The method uses two small sequence sets to generate a required sequence set, for example, a sequence set 1 is a Hadamard sequence set including 4 sequences having a length of 4, a sequence set 2 is a sequence set including V sequences having a length of 4, and by performing point multiplication operation on each sequence in the sequence set 2 and each sequence in the sequence set 1, a sequence set including 4*V sequences having a length of 4 may be obtained. Energy normalization may further be performed on the sequence in the sequence set, so that total energy of each sequence is 1 or L.

The sequence used by the base station receiver may be generated according to a preset rule. For instance, an element at a specified position of the sequence is fixed as a specified value, for example, a first element of the sequence is fixed as 1 and other elements of the sequence may be randomly selected from a value set {1, 1i, −1, −1i}; or one sequence is selected from a sequence set 1, one sequence is selected from a sequence set 2, and point multiplication is performed on the two sequences to obtain the used sequence.

When the data processing method provided by this application example is used to implement a grant-free solution, it is possible that the receiver does not know a sequence used by the transmitter. In this situation, the receiver may use all sequences or a part of sequences in the sequence set to perform blind detection on the received data. For example, supposing that the sequence set may include W sequences having a length of L, the receiver performs the blind detection on the received data by using all sequences in the sequence set, and a detection result including W*N pieces of data may be obtained. The detection result may include W rows, and each row may include 1*N pieces of data that are corresponding to one sequence in the sequence set.

In order to reduce a data size obtained by the blind detection, and lower a complexity of subsequent processing of the receiver, the sequence used by the receiver may further be a sequence identified, according a sequence set and the received data, from the sequence set. For example, supposing that the sequence set may include W sequences having a length of L and may be described as a W*L matrix Q, the received data is converted into a matrix M including L rows and N columns of data, an autocorrelation matrix X of the matrix M is calculated, and the autocorrelation matrix X is an L*L matrix; then, matrix multiplication operation is performed on the matrix Q, the matrix X and a conjugate transpose matrix Q' of the matrix Q to obtain a W*W matrix, diagonal elements of the matrix are obtained and absolute values of these elements are calculated; and then, by sorting, sequences corresponding to first Z larger values serve as the identified sequences; or, matrix multiplication operation is performed on the matrix W, an inverse matrix inv(X) of the matrix X and a conjugate transpose matrix Q' of the matrix Q to obtain a W*W matrix, diagonal elements of the matrix are obtained and absolute values of these elements are calculated; and then, by sorting, sequences corresponding to first Z smaller values serve as the identified sequences.

Then, the base station receiver performs differential detection on data detected by using the sequence.

The base station receiver may perform, by using at least one of the following manners, the differential detection on the data detected by using the sequence:

(1) Frequency domain differential detection: supposing that a transmitter uses one PRB for transmission, and the PRB has a frequency domain including 12 sub-carriers with indexes of 0-11 and a time domain including 14 symbols with indexes of 0-13, and the transmitter uses each symbol on a 0-th sub-carrier as a reference signal and symbols on other sub-carriers as data symbols, and performs differential encoding according to sym(n, i)=sym(n−1, i)*sym(n, i), wherein the n is a sub-carrier index and the n is greater than 0, the i is a symbol index, and the sym(n, i) denotes a symbol bearing at an n-th sub-carrier and an i-th symbol, a receiver may perform the differential detection according to DiffDetSym(n, i)=SeqDetSym(n, i)*conj(SeqDetSym(n−1, i)), wherein the n is a sub-carrier index and the n is greater than 0, the i is a symbol index, the conj( ) denotes conjugate operation, the SeqDetSym(n, i) denotes a symbol obtained at an n-th sub-carrier and an i-th symbol after the receiver makes the detection by using the sequence, and the DiffDetSym(n, i) denotes a symbol obtained on the n-th sub-carrier and the i-th symbol after the receiver performs the differential detection.

(2) Time domain differential detection: supposing that a transmitter uses one PRB for transmission, and the PRB has a frequency domain including 12 sub-carriers with indexes of 0-11 and a time domain including 14 symbols with indexes of 0-13, and the transmitter uses a 0-th symbol on each sub-carrier as a reference symbol and other symbols on each sub-carrier as data symbols and perform differential encoding according to sym(n, i)=sym(n, i−1)*sym(n, i), wherein the n is a sub-carrier index, the i is a symbol index and the i is greater than 0, a receiver may perform differential detection according to DiffDetSym(n, i)=SeqDetSym(n, i)*conj(SeqDetSym(n, i−1)), wherein the n is a sub-carrier index, the i is a symbol index and the i is greater than 0; and if the transmitter uses one sub-carrier for single-tone transmission, and a resource unit has a frequency domain only including one sub-carrier and a time domain including T symbols with indexes of 0 to T−1, and the transmitters uses a 0-th symbol as a reference symbol and other symbols as data symbols, and performs differential encoding according to sym(i)=sym(i−1)*sym(i), wherein the i is a symbol index and the i is greater than 0, the receiver may perform the differential detection according to DiffDetSym(i)=SeqDetSym(i)*conj(SeqDetSym(i−1)), wherein the i is a symbol index and the i is greater than 0.

(3) Time-frequency domain differential detection: the time-frequency domain differential detection may be the frequency domain differential detection first and then the time domain differential detection, and may also be the time domain differential detection first and then the frequency domain differential detection. Corresponding to the differential encoding process of the transmitter, if a transmitter first performs the frequency domain differential encoding and then performs the time domain differential encoding, a receiver first performs the time domain differential detection and then performs the frequency domain differential detection; and if the transmitter first performs the time domain differential encoding and then performs the frequency domain differential encoding, the receiver first performs the frequency domain differential detection and then performs the time domain differential detection. The processes of the frequency domain differential detection and the time domain differential detection are similar to the above description and will no longer be repeated.

(4) Segmental differential detection: the segmental differential detection may be used in cooperation with the frequency domain differential detection, the time domain differential detection, or the time-frequency domain differential detection, to implement frequency domain segmental differential detection, time domain segmental differential detection, or time-frequency domain segmental differential detection. Corresponding to the differential encoding process of the transmitter, the specific processes are similar to the above description and will no longer be repeated.

Then, the base station receiver demodulates and decodes data obtained after the differential detection.

Herein, the base station receiver may further perform weighting processing on the data obtained after the differential detection, and then demodulate and decode the obtained data. For example, it may use an SINR for scalar weighting or vector weighting, etc.

The base station receiver may use multiple sequences to detect the received data to obtain multiple detection results; and with differential detection on each detection result, multiple detection results may also be obtained. In this situation, the base station receiver may demodulate and decode several detection results having a larger SINR or the detection results having an SINR greater than a specified threshold value; or, the base station receiver may respectively perform the weighting processing on several detection results having a larger SINR or the detection results having an SINR greater than a specified threshold value and then demodulate and decode the results; or, the base station receiver may respectively perform weighting processing on the multiple detection results and then demodulate and decode several detection results having a larger SINR or the detection results having an SINR greater than a specified threshold value.

Then, when the base station receiver obtains correctly received data upon demodulating and decoding, the base station receiver may obtain information from the correctly received data.

The base station may determine whether the decoding is correct according to a Cyclic Redundancy Check (CRC) result output during decoding, and thus may determine whether the correctly received data is obtained.

The information that may be obtained by the base station receiver from the correctly received data may include at least one of: traffic data transmitted by the transmitter; an identity code of the transmitter; a sequence used by the transmitter; a sequence set where the sequence used by the transmitter is located; and a reference signal used and transmitted by the transmitter.

Then, according to the obtained information, the base station receiver may reconstruct the data transmitted by the transmitter so as to eliminate interference. The reconstruction process is similar to the processing process that the transmitter transmits the data, for example, the transmitter performs encoding and modulation on a data bit, performs differential encoding and then performs spreading or modulation processing by using a sequence to obtain the data transmitted by the transmitter.

In order to eliminate the interference more accurately, reduce an interference cancellation error and prevent error propagation, the base station receiver may further use data obtained after the reconstruction for channel estimation. In some exemplary implementation, with the data obtained after the reconstruction as a reference signal, the channel estimation is performed according to the data received by the base station receiver, to obtain a channel estimation result.

When the base station receiver detects and obtains data of multiple transmitters or users, the base station receiver may use reconstructed data, respectively corresponding to these users, to implement multi-user joint channel estimation. In some exemplary implementation, for example, the multi-user joint channel estimation may be implemented based on a least square algorithm to obtain channel estimation results respectively corresponding to these users.

Additionally, when the channel estimation result is obtained, the base station receiver may further smooth the channel estimation result; and by means of smoothing, the channel estimation result may be improved.

Then, the base station receiver may remove, from the received data, interference caused by data that is detected and received correctly and transmitted by the transmitter. The data received by the base station receiver may include data received by each receiving antenna of the receiver. Moreover, the base station receiver obtains, via the reconstruction process, the data that is detected and received correctly and transmitted by the transmitter. The base station may remove, according to the data obtained after the reconstruction and the channel estimation result, the interference of the data from the data received by the receiver, to implement the interference cancellation. When data transmitted by multiple users is detected and received correctly by the base station receiver, the base station receiver may perform the interference cancellation on the data transmitted by these users.

Upon the interference cancellation process, the data received by the base station receiver is updated; and according to the updated received data, the base station receiver may re-execute the processing process of the receiver, so as to perform receiving detection on other users or data streams that have not yet been identified and detected.

In this application example, the base station receiver may further perform frequency offset compensation and/or time offset compensation on the data in the process when the data is detected or reconstruction is performed based on the data.

In this application example, when the base station receiver does not obtain the correctly received data upon demodulating and decoding, the receiving detection process is ended.

In this application example, the base station receiver may further determine whether the receiving detection process is ended according to other conditions. For example, after obtaining the information from the correctly received data, the receiver may determine whether the number of executed iteration times of the receiving detection reaches the maximum number of iteration times that is preset or determined according to a preset rule; if no, a subsequent operation is executed continuously; and if yes, the receiving detection process is ended.

Fifth Application Example

This application example provides a data processing method.

In this application example, a base station receiver first performs differential detection on received data.

The data received by the base station receiver may include data received by each receiving antenna of the receiver.

The base station receiver may perform the differential detection on the received data by using at least one of the following manners: frequency domain differential detection, time domain differential detection, time-frequency domain differential detection ad segmental differential detection. Corresponding to a differential encoding process of a transmitter, the specific process is similar to the description in the above implementation manner and will no longer be repeated.

Then, the base station receiver detects, by using a sequence, data obtained after the differential detection.

The operation that the base station receiver detects, by using a sequence, data obtained after the differential detection may include that: the data obtained after the differential detection is converted into a matrix M including L rows and N columns of data, and the matrix M is detected by using the sequence S; or, the data obtained after the differential detection is subjected to specified processing and then converted into a matrix M including L rows and N columns of data, and the matrix M is detected by using the sequence S; or, the data obtained after the differential detection is converted into a matrix M including L rows and N columns of data, an autocorrelation matrix X of the matrix M is calculated, and the matrix M is detected by using the sequence S and the autocorrelation matrix X; or, the data obtained after the differential detection is subjected to specified processing and then converted into a matrix M including L rows and N columns of data, an autocorrelation matrix X of the matrix M is calculated, and the matrix M is detected by using the sequence S and the autocorrelation matrix X. The L is a length of the sequence; and the specific process is similar to the description in the above implementation manner and will no longer be repeated.

The data obtained after the differential detection is subjected to the specified processing, for example, data obtained after the differential detection and corresponding to multiple receiving antennas is combined according to a preset rule. The preset rule may include a preset combining method, a preset combining vector, etc., which is similar to the description of the above implementation manner specifically and will not be repeated; and it may further be appropriate to perform frequency offset compensation and/or time offset compensation and the like on the data obtained after the differential detection.

The sequence used by the base station receiver may include at least one of: a sequence in a sequence set; a sequence generated according to a preset rule; and a sequence identified, according to a sequence set and the data obtained after the differential detection, from the sequence set. The specific content is similar to the description of the above implementation manner specifically and will not be repeated.

Then, the base station receiver demodulates and decodes data detected by using the sequence.

Herein, the base station receiver may further perform weighting processing on the data detected by using the sequence, and then demodulate and decode the obtained data. For example, it may use an SINR for scalar weighting or vector weighting, etc.

The base station receiver may use multiple sequences to detect the data, obtained after the differential detection, to obtain multiple detection results. In this situation, the base station receiver may demodulate and decode several detection results having a larger SINR or the detection results having an SINR greater than a specified threshold value; or, the base station receiver may respectively perform the weighting processing on several detection results having a larger SINR or the detection results having an SINR greater than a specified threshold value and then demodulate and decode the results; or, the base station receiver may respectively perform weighting processing on the multiple detection results and then demodulate and decode several detection results having a larger SINR or the detection results having an SINR greater than a specified threshold value.

Then, when the base station receiver obtains correctly received data upon demodulating and decoding, the base station receiver may obtain information from the correctly received data.

The information that may be obtained by the base station receiver from the correctly received data may include at least one of: traffic data transmitted by the transmitter; an identity code of the transmitter; a sequence used by the transmitter; a sequence set where the sequence used by the transmitter is located; and a reference signal used and transmitted by the transmitter.

Then, according to the obtained information, the base station receiver may reconstruct the data transmitted by the transmitter so as to eliminate interference. The reconstruction process is similar to the processing process that the transmitter transmits the data, for example, the transmitter performs encoding and modulation on a data bit, performs spreading or modulation processing by using a sequence and then performs differential encoding to obtain the data transmitted by the transmitter.

In order to eliminate the interference more accurately, reduce an interference cancellation error and prevent error propagation, the base station receiver may further use data obtained after the reconstruction for channel estimation. In some exemplary implementation, with the data obtained after the reconstruction as a reference signal, the channel estimation is performed according to the data received by the base station receiver, to obtain a channel estimation result.

When the base station receiver detects and obtains data of multiple transmitters or users, the base station receiver may use reconstructed data, respectively corresponding to these users, to implement multi-user joint channel estimation. In some exemplary implementation, for example, the multi-user joint channel estimation may be implemented based on a least square algorithm to obtain channel estimation results respectively corresponding to these users.

Then, the base station receiver may remove, from the received data, interference caused by data that is detected and received correctly and transmitted by the transmitter. The data received by the base station receiver may include data received by each receiving antenna of the receiver. Moreover, the base station receiver obtains, via the reconstruction process, the data that is detected and received correctly and transmitted by the transmitter. The base station may remove, according to the data obtained after the reconstruction and the channel estimation result, the interference of the data from the data received by the receiver, to implement the interference cancellation. When data transmitted by multiple users is detected and received correctly by the base station receiver, the base station receiver may perform the interference cancellation on the data transmitted by these users.

Upon the interference cancellation process, the data received by the base station receiver is updated; and according to the updated received data, the base station receiver may re-execute the processing process of the receiver, so as to perform receiving detection on other users or data streams that have not yet been identified and detected.

Sixth Application Example

This application example provides a data processing method.

In this application example, a base station receiver first detects received data by using a sequence.

The data received by the base station receiver may include at least one of: data received by each receiving antenna of the receiver; and data obtained by combining, according to a preset rule, data that is received by multiple receiving antennas of the receiver. The process of combining according to the preset rule is similar to the description in the above implementation manner, and will no longer be repeated. Herein, the base station receiver may further perform frequency offset compensation and/or time offset compensation on the received data, for example, perform the compensation according to a preset compensation quantity, etc.

The operation that a base station receiver detects received data by using a sequence may include that: the received data is converted into a matrix M including L rows and N columns of data, and the matrix M is detected by using the sequence S; or, the received data is converted into a matrix M including L rows and N columns of data, an autocorrelation matrix X of the matrix M is calculated, and the matrix M is detected by using the sequence S and the autocorrelation matrix X. The L is a length of the sequence; and the specific process is similar to the description in the above implementation manner and will no longer be repeated.

The sequence used by the base station receiver may include at least one of: a sequence in a sequence set; a sequence generated according to a preset rule; and a sequence identified, according to a sequence set and the received data, from the sequence set. The specific content is similar to the description of the above implementation manner specifically and will not be repeated.

Then, the base station receiver performs channel estimation and compensation on the data detected by using the sequence.

The operation that the base station receiver performs channel estimation and compensation on the data detected by using the sequence at least may include one of: channel information is obtained according to the data detected by using the sequence, and channel compensation is performed on the data detected by using the sequence; channel information is obtained according to a reference signal, and channel compensation is performed on the data detected by using the sequence; channel information is obtained according to a reference signal and the data detected by using the sequence, and channel compensation is performed on the data detected by using the sequence; channel information is obtained according to a reference signal in the data detected by using the sequence, and channel compensation is performed on the data detected by using the sequence; channel information is obtained according to a reference signal in the data detected by using the sequence, and channel compensation is performed on a data symbol in the data detected by using the sequence; channel information is obtained according to a reference signal and a data symbol in the data detected by using the sequence, and channel compensation is performed on the data detected by using the sequence; and channel information is obtained according to a reference signal and a data symbol in the data detected by using the sequence, and channel compensation is performed on the data symbol in the data detected by using the sequence. The channel compensation is intended to eliminate an influence of a channel, and may also be referred to as channel equalization.

When the data processing method provided by this application example is used to implement a grant-free solution, it is possible that the receiver does not know a reference signal used by the transmitter. In this situation, the receiver may use all reference signals in a reference signal set to obtain the channel information by means of a channel blind estimation manner.

The receiver obtains the channel information according to the data detected by using the sequence, which may also be referred as a channel blind estimation process. In some exemplary implementation, the receiver may blindly estimate the channel information, such as a channel rotation phase, according to statistic information of the data detected by using the sequence.

The receiver may obtain the channel information in combination with the reference signal and the data symbol. For example, the channel information obtained according to the reference signal is used to adjust the channel information obtained according to the data symbol, which is helpful to obtain more accurate channel information.

The base station receiver may further smooth the obtained channel information; and the obtained channel information may be improved by means of the smoothing process.

The base station receiver may further perform frequency offset compensation and/or time offset compensation on the data detected by using the sequence.

Then, the base station receiver demodulates and decodes data obtained after the channel compensation.

Herein, the base station receiver may further perform specified processing on the data obtained after the channel compensation, and then demodulate and decode the obtained data. The specified processing may include negation processing, scalar weighting or vector weighting performed by using a preset factor, scalar weighting or vector weighting performed by using an SINR, etc. As the obtained channel information may be uncertain, the receiver may further demodulate and decode data not subjected to the specified processing and the data subjected to the specified processing. In addition, the specified processing may also be implemented after the data is demodulated.

The base station receiver may use multiple sequences to detect the received data to obtain multiple detection results. In this situation, the base station receiver may demodulate and decode several detection results having a larger SINR or the detection results having an SINR greater than a specified threshold value; or, the base station receiver may respectively perform the specified processing on several detection results having a larger SINR or the detection results having an SINR greater than a specified threshold value and then demodulate and decode the results; or, the base station receiver may respectively perform the specified processing on the multiple detection results and then demodulate and decode several detection results having a larger SINR or the detection results having an SINR greater than a specified threshold value.

Then, when the base station receiver obtains correctly received data upon demodulating and decoding, the base station receiver may obtain information from the correctly received data.

The information that may be obtained by the base station receiver from the correctly received data may include at least one of: traffic data transmitted by the transmitter; an identity code of the transmitter; a sequence used by the transmitter; a sequence set where the sequence used by the transmitter is located; and a reference signal used and transmitted by the transmitter.

Then, according to the obtained information, the base station receiver may reconstruct the data transmitted by the transmitter so as to eliminate interference. The reconstruction process is similar to the processing process that the transmitter transmits the data, for example, the transmitter performs encoding and modulation on a data bit, and then performs spreading or modulation processing by using a sequence to obtain the data transmitted by the transmitter.

In order to eliminate the interference more accurately, reduce an interference cancellation error and prevent error propagation, the base station receiver may further use data obtained after the reconstruction for channel estimation. In some exemplary implementation, with the data obtained after the reconstruction as a reference signal, the channel estimation is performed according to the data received by the base station receiver, to obtain a channel estimation result.

When the base station receiver detects and obtains data of multiple transmitters or users, the base station receiver may use reconstructed data, respectively corresponding to these users, to implement multi-user joint channel estimation. In some exemplary implementation, for example, the multi-user joint channel estimation may be implemented based on a least square algorithm to obtain channel estimation results respectively corresponding to these users.

Then, the base station receiver may remove, from the received data, interference caused by data that is detected and received correctly and transmitted by the transmitter. The data received by the base station receiver may include data received by each receiving antenna of the receiver. Moreover, the base station receiver obtains, via the reconstruction process, the data that is detected and received correctly and transmitted by the transmitter. The base station may remove, according to the data obtained after the reconstruction and the channel estimation result, the interference of the data from the data received by the receiver, to implement the interference cancellation. When data transmitted by multiple users is detected and received correctly by the base station receiver, the base station receiver may perform the interference cancellation on the data transmitted by these users.

Upon the interference elimination process, the data received by the base station receiver is updated; and according to the updated received data, the base station receiver may re-execute the processing process of the receiver, so as to perform receiving detection on other users or data streams that have not yet been identified and detected.

Fourth Embodiment

This embodiment of the present disclosure further provides a storage medium. In some implementation of the embodiment, in this embodiment, the storage medium may be configured to store a program code for executing the following operation.

S1, first data is generated, wherein the operation that the first data is generated may include one of: differential encoding is performed on second data to generate third data, and the third data is processed by using a sequence to generate the first data; the second data is processed by using a sequence to generate fourth data, and the differential encoding is performed on the fourth data to generate the first data; and the second data is processed by using a sequence to generate the first data.

In some implementation of the embodiment, in this embodiment, the storage medium may include but not limited to: various media capable of storing a program code such as a U disk, an ROM, an RAM, a mobile hard disk, a magnetic disk or an optical disc.

In some implementation of the embodiment, in this embodiment, a processor executes the following operation according to the program code stored in the storage medium:

First data is generated, wherein the operation that the first data is generated may include one of: differential encoding is performed on second data to generate third data, and the third data is processed by using a sequence to generate the first data; the second data is processed by using a sequence to generate fourth data, and the differential encoding is performed on the fourth data to generate the first data; and the second data is processed by using a sequence to generate the first data.

In some implementation of the embodiment, the specific example in this embodiment may be referred to the examples described in the above embodiments and exemplary implementation manners, and will no longer be repeated herein.

It is apparent that those skilled in the art should understand that the modules or operations of the present disclosure may be implemented by a general-purpose computing device and centralized in a single computing device or distributed over a network consisting of a plurality of computing devices. In some implementation of the embodiment, they may be implemented by a program code executable by a computing device, so that they may be stored in a storage device and executed by the computing device. Moreover, they may be different from the operations illustrated or described herein in some cases, or implemented by respectively fabricating them into respective integrated circuit modules or by fabricating a plurality of modules or operations of them into a single integrated circuit module. By doing so, the present disclosure is not limited to any specific combination of hardware and software.

The above are only preferred embodiments of the present disclosure and should not be used for limiting the present disclosure. For those skilled in the art, the present disclosure may have various modifications and changes. Any modifications, equivalent replacements, improvements and the like within the spirit and principle of the present disclosure shall fall within the scope of protection of the present disclosure.

INDUSTRIAL APPLICABILITY

The present disclosure is applied to the field of communications, is used to solve at least one of problems of insufficient flexibility, a small number of supported users, a large resource overhead, a poor system transmission efficiency, a high complexity of a receiver and the like in the relevant art, may implement more flexible and efficient grant-free and non-orthogonal transmission, and has a good system transmission efficiency and a low receiver complexity.

What is claimed is:

1. A data processing method, comprising:
   generating first data, wherein generating the first data comprises one of:
   performing differential encoding on second data to generate third data, and performing spreading or modulation processing on the third data by using a sequence to generate the first data;
   performing spreading or modulation processing on the second data by using a sequence to generate fourth data, and performing differential encoding on the fourth data to generate the first data; and
   performing spreading or modulation processing on the second data by using a sequence to generate the first data;
   wherein the second data comprises data information, and the data information comprises: data bits, or one or more data symbols generated by performing encoding and modulation on data bits, wherein the data bits comprise user identity information, sequence information and reference signal information.

2. The method as claimed in 1, wherein the second data further comprises a reference signal.

3. The method as claimed in 2, wherein the reference signal comprises one of: a reference signal determined according to user identity information; a reference signal determined from a reference signal set; and a preset reference signal.

4. The method as claimed in 1, wherein the data bits further comprise at least one of: payload information; and sequence set information.

5. The method as claimed in 1, wherein the sequence comprises at least one of:
a sequence randomly selected from a first sequence set;
a sequence generated according to a first preset rule;
wherein the sequence has a length of L, the L being an integer greater than 1,
wherein the first preset rule comprises one of: an element at a specified position of the sequence is fixed as a specified value, and other elements of the sequence are randomly selected from a value set; each element of the sequence is randomly selected from the value set; point multiplication operation is performed on two sequences which are obtained from two sequence sets respectively.

6. The method as claimed in 1, wherein performing the differential encoding on the second data to generate the third data comprises one of:
performing, in a specified manner, the differential encoding on the second data to generate the third data;
performing, in a specified manner, the differential encoding on the second data according to a reference signal to generate the third data;
performing, in a specified manner, the differential encoding on the second data according to a reference signal in the second data to generate the third data; and
performing, in a specified manner, the differential encoding on one or more data symbols in the second data according to a reference signal in the second data to generate the third data;
wherein the specified manner comprises at least one of: frequency domain differential encoding, time domain differential encoding, time-frequency domain differential encoding, and segmental differential encoding.

7. The method as claimed in 1, wherein performing the differential encoding on the fourth data to generate the first data comprises one of:
performing, in a specified manner, the differential encoding on the fourth data to generate the first data;
performing, in a specified manner, the differential encoding on the fourth data according to a reference signal to generate the first data;
performing, in a specified manner and according to a symbol included in the fourth data and obtained by processing a reference signal by using a sequence, the differential encoding on the fourth data to generate the first data; and
performing, in a specified manner and according to a symbol included in the fourth data and obtained by processing a reference signal by using a sequence, the differential encoding on the symbol included in the fourth data and obtained by processing the reference signal by using the sequence to generate the first data;
wherein the specified manner comprises at least one of: frequency domain differential encoding, time domain differential encoding, time-frequency domain differential encoding, and segmental differential encoding.

8. The method as claimed in 1, wherein after generating the first data, the method further comprises: forming, on a specified time-frequency resource based on the first data, a transmission signal to be transmitted, wherein the specified time-frequency resource is obtained via at least one of the following manners: the specified time-frequency resource is selected randomly, the specified time-frequency resource is determined according to a second preset rule, and the specified time-frequency resource is determined according to system configuration information.

9. A data processing method, comprising:
obtaining sixth data, wherein obtaining the sixth data comprises one of:
detecting seventh data by using a sequence to obtain eighth data, and performing differential detection on the eighth data to obtain the sixth data;
performing differential detection on the seventh data to obtain ninth data, and detecting the ninth data by using a sequence to obtain the sixth data; and
detecting the seventh data by using a sequence to obtain tenth data, and performing compensation processing on the tenth data to obtain the sixth data;
wherein the seventh data comprises data obtained by combining, according to a preset combining vector, data received by multiple receiving antennas of a receiver.

10. The method as claimed in 9, wherein the sequence comprises at least one of:
a sequence generated according to a third preset rule;
a sequence identified, according to a second sequence set and the seventh data, from the second sequence set; and
a sequence identified, according to a third sequence set and the ninth data, from the third sequence set;
wherein the sequence has a length of L, the L being an integer greater than 1,
wherein the third preset rule comprises one of: an element at a specified position of the sequence is fixed as a specified value, other elements of the sequence are randomly selected from a value set; point multiplication operation is performed on two sequences which are obtained from two sequence sets respectively.

11. The method as claimed in 12, wherein detecting the seventh data by using the sequence comprises one of:
detecting, by using the sequence, data obtained by processing the seventh data;
obtaining a correlation matrix according to the seventh data, and detecting the seventh data by using the sequence and the correlation matrix; and
obtaining a correlation matrix according to data obtained by processing the seventh data, and detecting, by using the sequence and the correlation matrix, the data obtained by processing the seventh data.

12. The method as claimed in 12, wherein the differential detection comprises at least one of: frequency domain differential detection, time domain differential detection, time-frequency domain differential detection, and segmental differential detection.

13. The method as claimed in 12, wherein detecting the ninth data by using the sequence to obtain the sixth data comprises one of:
detecting, by using the sequence, data obtained by processing the ninth data to obtain the sixth data;
obtaining a correlation matrix according to the ninth data, and detecting the ninth data by using the sequence and the correlation matrix to obtain the sixth data; and
obtaining a correlation matrix according to data obtained by processing the ninth data, and detecting, by using the sequence and the correlation matrix, the data obtained by processing the ninth data to obtain the sixth data.

14. The method as claimed in 12, wherein after obtaining the sixth data, the method further comprises: obtaining eleventh data according to the sixth data, and obtaining the eleventh data according to the sixth data comprises at least one of:
- demodulating and decoding the sixth data to obtain the eleventh data;
- demodulating and decoding data obtained by processing the sixth data to obtain the eleventh data;
- demodulating and decoding the sixth data meeting a first predetermined condition to obtain the eleventh data;
- demodulating and decoding data obtained by processing the sixth data meeting a second predetermined condition to obtain the eleventh data; and
- demodulating and decoding data obtained by processing the sixth data and meeting a third predetermined condition to obtain the eleventh data.

15. The method as claimed in 19, wherein after obtaining the eleventh data according to the sixth data, the method further comprises at least one of:
- obtaining, from the eleventh data, at least one of the following information: payload information; user identity information; sequence information; sequence set information; and reference signal information; and
- performing reconstruction based on the eleventh data to obtain twelfth data.

16. The method as claimed in 20, wherein after performing reconstruction based on the eleventh data to obtain the twelfth data, the method further comprises at least one of:
- performing channel estimation by using the twelfth data to obtain a channel estimation result; and
- eliminating interference of the twelfth data from data received by a receiver.

17. A transmitter, comprising:
a processor and a memory storing an instruction executable to the processor, wherein when the instruction is executed by the processor, the following operations are executed:
generating first data, wherein generating the first data comprises one of:
- performing differential encoding on second data to generate third data, and performing spreading or modulation processing on the third data by using a sequence to generate the first data;
- performing spreading or modulation processing on the second data by using a sequence to generate fourth data, and performing differential encoding on the fourth data to generate the first data; and
- performing spreading or modulation processing on the second data by using a sequence to generate the first data;

wherein the second data comprises data information, and the data information comprises: data bits, or one or more data symbols generated by performing encoding and modulation on data bits, wherein the data bits comprise user identity information, sequence information and reference signal information.

18. A receiver, comprising:
a processor and a memory storing an instruction executable to the processor, wherein when the instruction is executed by the processor, the following operations are executed:
obtaining sixth data, wherein obtaining the sixth data comprises one of:
- detecting seventh data by using a sequence to obtain eighth data, and performing differential detection on the eighth data to obtain the sixth data;
- performing differential detection on the seventh data to obtain ninth data, and detecting the ninth data by using a sequence to obtain the sixth data; and
- detecting the seventh data by using a sequence to obtain tenth data, and performing compensation processing on the tenth data to obtain the sixth data;

wherein the seventh data comprises data obtained by combining, according to a preset combining vector, data received by multiple receiving antennas of a receiver.

* * * * *